(12) United States Patent
Raterman et al.

(10) Patent No.: US 11,255,997 B2
(45) Date of Patent: Feb. 22, 2022

(54) STIMULATED ROCK VOLUME ANALYSIS

(71) Applicant: CONOCOPHILLIPS COMPANY, Houston, TX (US)

(72) Inventors: Kevin T. Raterman, Houston, TX (US); Helen E. Farrell, Sugar Land, TX (US); Kyle Friehauf, Houston, TX (US); Raymond R. Reid, Jr., Houston, TX (US); Ge Jin, Houston, TX (US); Baishali Roy, Houston, TX (US); Dana M. Jurick, Houston, TX (US); Seth Busetti, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 567 days.

(21) Appl. No.: 15/972,882

(22) Filed: May 7, 2018

(65) Prior Publication Data
US 2018/0364381 A1    Dec. 20, 2018

Related U.S. Application Data

(60) Provisional application No. 62/519,450, filed on Jun. 14, 2017.

(51) Int. Cl.
*G01V 1/30* (2006.01)
*G01V 1/28* (2006.01)
(Continued)

(52) U.S. Cl.
CPC .......... *G01V 1/308* (2013.01); *E21B 41/0092* (2013.01); *E21B 43/26* (2013.01);
(Continued)

(58) Field of Classification Search
CPC ........ G01V 1/308; G01V 1/226; G01V 1/282; G01V 1/288; G01V 1/42; G01V 9/005;
(Continued)

(56) References Cited

U.S. PATENT DOCUMENTS

| | | | |
|---|---|---|---|
| 3,981,187 | A | 9/1976 | Howell |
| 4,676,664 | A | 6/1987 | Anderson et al. |

(Continued)

FOREIGN PATENT DOCUMENTS

| | | |
|---|---|---|
| GB | 2492802 A | 1/2013 |
| WO | 2001048353 A1 | 7/2001 |

(Continued)

OTHER PUBLICATIONS

Webster, P., Cox, B. and Molenaar, M., Aug. 2013. Developments in diagnostic tools for hydraulic fracture geometry analysis. In Unconventional Resources Technology Conference (pp. 218-224). Society of Exploration Geophysicists, American Association of Petroleum Geologists, SPE (Year: 2013).*

(Continued)

*Primary Examiner* — Chuen-Meei Gan
(74) *Attorney, Agent, or Firm* — ConocoPhillips Company

(57) ABSTRACT

A data acquisition program, which includes core, image log, microseismic, DAS, DTS, and pressure data, is described. This program can be used in conjunction with a variety of techniques to accurately monitor and conduct well stimulation.

15 Claims, 17 Drawing Sheets

(51) Int. Cl.

| | | |
|---|---|---|
| *G01V 9/00* | (2006.01) | |
| *E21B 49/00* | (2006.01) | |
| *E21B 43/26* | (2006.01) | |
| *E21B 41/00* | (2006.01) | |
| *E21B 49/02* | (2006.01) | |
| *G01V 1/42* | (2006.01) | |
| *G01V 1/22* | (2006.01) | |
| *E21B 47/002* | (2012.01) | |
| *E21B 43/267* | (2006.01) | |
| *E21B 47/06* | (2012.01) | |
| *E21B 47/07* | (2012.01) | |

(52) U.S. Cl.
CPC ............ *E21B 47/002* (2020.05); *E21B 49/00* (2013.01); *E21B 49/02* (2013.01); *G01V 1/226* (2013.01); *G01V 1/282* (2013.01); *G01V 1/288* (2013.01); *G01V 1/42* (2013.01); *G01V 9/005* (2013.01); *E21B 43/267* (2013.01); *E21B 47/06* (2013.01); *E21B 47/07* (2020.05); *G01V 2210/1234* (2013.01); *G01V 2210/646* (2013.01); *G01V 2210/663* (2013.01)

(58) Field of Classification Search
CPC .... E21B 47/002; E21B 41/0092; E21B 43/26; E21B 49/00; E21B 49/02
See application file for complete search history.

(56) References Cited

U.S. PATENT DOCUMENTS

| | | | |
|---|---|---|---|
| 6,026,913 A | 2/2000 | Mandal et al. | |
| 6,176,323 B1 | 1/2001 | Weirich et al. | |
| 6,268,911 B1 | 7/2001 | Tubel et al. | |
| 6,778,720 B1 | 8/2004 | Cekroich et al. | |
| 7,055,604 B2 | 6/2006 | Jee et al. | |
| 7,668,411 B2 | 2/2010 | Davies et al. | |
| 8,505,625 B2 | 8/2013 | Ravi et al. | |
| 8,630,816 B2 | 1/2014 | Park et al. | |
| 8,646,968 B2 | 2/2014 | MacDougall et al. | |
| 8,930,143 B2 | 1/2015 | Sierra et al. | |
| 8,950,482 B2 | 2/2015 | Hill et al. | |
| 9,116,119 B2 | 8/2015 | Le Floch | |
| 9,273,548 B2 | 3/2016 | LeBlanc et al. | |
| 9,347,310 B2 | 5/2016 | Unalmis et al. | |
| 9,416,644 B2 | 8/2016 | McEwen-King et al. | |
| 9,464,512 B2 | 10/2016 | Kalia et al. | |
| 10,095,828 B2 | 10/2018 | Swan et al. | |
| 2002/0180728 A1 | 12/2002 | Neff et al. | |
| 2003/0205375 A1 | 11/2003 | Wright et al. | |
| 2006/0272809 A1 | 12/2006 | Tubel et al. | |
| 2008/0277568 A1 | 11/2008 | Crickmore et al. | |
| 2009/0114386 A1 | 5/2009 | Hartog et al. | |
| 2009/0194333 A1 | 8/2009 | MacDonald | |
| 2009/0326826 A1 | 12/2009 | Hull et al. | |
| 2010/0076738 A1 | 3/2010 | Dean et al. | |
| 2010/0200743 A1 | 8/2010 | Forster et al. | |
| 2010/0200744 A1 | 8/2010 | Pearce et al. | |
| 2010/0284250 A1 | 11/2010 | Cornish et al. | |
| 2011/0019178 A1 | 1/2011 | Vlatas | |
| 2011/0188347 A1 | 8/2011 | Thiercelin et al. | |
| 2011/0288843 A1 | 11/2011 | Weng et al. | |
| 2012/0017687 A1 | 1/2012 | Davis et al. | |
| 2012/0057432 A1 | 3/2012 | Hill et al. | |
| 2012/0067118 A1 | 3/2012 | Hartog et al. | |
| 2012/0092960 A1 | 4/2012 | Gaston et al. | |
| 2012/0133367 A1 | 5/2012 | Bittar et al. | |
| 2012/0147924 A1 | 6/2012 | Hall | |
| 2013/0023353 A1 | 1/2013 | Wright | |
| 2013/0032338 A1 | 2/2013 | Kalia et al. | |
| 2013/0211726 A1 | 8/2013 | Mestayer et al. | |
| 2013/0233537 A1* | 9/2013 | McEwen-King ..... | E21B 43/267 166/250.1 |
| 2013/0298635 A1 | 11/2013 | Godfrey | |
| 2013/0298665 A1 | 11/2013 | Minchau | |
| 2014/0036628 A1 | 2/2014 | Hill et al. | |
| 2014/0100274 A1 | 4/2014 | Bobotas et al. | |
| 2014/0110124 A1 | 4/2014 | Goldner et al. | |
| 2014/0126325 A1 | 5/2014 | Farhadiroushan et al. | |
| 2014/0163889 A1 | 6/2014 | Finfer et al. | |
| 2014/0180592 A1 | 6/2014 | Ravi et al. | |
| 2014/0202240 A1 | 7/2014 | Skinner et al. | |
| 2014/0216151 A1 | 8/2014 | Godfrey | |
| 2014/0246191 A1 | 9/2014 | Zolezzi-Garreton | |
| 2014/0260588 A1 | 9/2014 | Jaaskelainen et al. | |
| 2014/0290936 A1 | 10/2014 | Wills et al. | |
| 2014/0358444 A1 | 12/2014 | Friehauf et al. | |
| 2014/0365130 A1 | 12/2014 | Woods | |
| 2015/0000932 A1 | 1/2015 | O'Brien | |
| 2015/0014521 A1 | 1/2015 | Barfoot | |
| 2015/0057934 A1 | 2/2015 | Ma et al. | |
| 2015/0083405 A1 | 3/2015 | Dobroskok et al. | |
| 2015/0135819 A1 | 5/2015 | Petrella et al. | |
| 2015/0146759 A1 | 5/2015 | Johnston | |
| 2015/0159478 A1 | 6/2015 | Georgi et al. | |
| 2015/0331971 A1 | 11/2015 | Scollard et al. | |
| 2016/0003032 A1 | 1/2016 | Grubb et al. | |
| 2016/0138389 A1 | 5/2016 | Stokely | |
| 2016/0146962 A1 | 5/2016 | Hayward | |
| 2016/0265345 A1 | 9/2016 | In't Panhuis et al. | |
| 2016/0266276 A1 | 9/2016 | Stokely et al. | |
| 2016/0356125 A1 | 12/2016 | Bello et al. | |
| 2017/0045410 A1 | 2/2017 | Crickmore et al. | |
| 2017/0075005 A1 | 3/2017 | Ranjan et al. | |
| 2017/0075006 A1* | 3/2017 | Dusterhoft .............. | E21B 49/00 |
| 2017/0191363 A1* | 7/2017 | Dickenson ............ | E21B 47/135 |
| 2017/0205260 A1 | 7/2017 | Jaaskelainen et al. | |
| 2017/0260839 A1 | 9/2017 | Beardmore et al. | |
| 2017/0260842 A1 | 9/2017 | Jin et al. | |
| 2017/0260846 A1 | 9/2017 | Jin et al. | |
| 2017/0260849 A1 | 9/2017 | Friehauf et al. | |
| 2017/0260854 A1 | 9/2017 | Jin et al. | |
| 2017/0328181 A1 | 11/2017 | Kristjansson et al. | |
| 2017/0342814 A1 | 11/2017 | Krueger et al. | |
| 2018/0016890 A1 | 1/2018 | Friehauf | |
| 2018/0045040 A1 | 2/2018 | Swan et al. | |
| 2018/0217285 A1 | 8/2018 | Walters et al. | |
| 2018/0230049 A1 | 8/2018 | Wysocki et al. | |
| 2018/0230783 A1* | 8/2018 | Weng .................. | E21B 41/0092 |
| 2018/0348389 A1 | 12/2018 | Jaaskelainen et al. | |

FOREIGN PATENT DOCUMENTS

| | | |
|---|---|---|
| WO | 2013092906 A2 | 6/2013 |
| WO | 2014201316 A1 | 12/2014 |
| WO | 2015065869 A1 | 5/2015 |
| WO | 2015076976 A1 | 5/2015 |
| WO | 2015187140 A1 | 12/2015 |
| WO | 2017027340 A1 | 2/2017 |

OTHER PUBLICATIONS

Paleja, Rakesh, Daria Mustafina, Timothy Park, David Randell, Juun van der Horst, and Roger Crickmore. "Velocity tracking for flow monitoring and production profiling using distributed acoustic sensing." In SPE Annual Technical Conference and Exhibition. Society of Petroleum Engineers, 2015. (Year: 2015).*

Molenaar, Mathieu M., Erkan Fidan, and David J. Hill. "Real-time downhole monitoring of hydraulic fracturing treatments using fibre optic distributed temperature and acoustic sensing." In SPE/EAGE European Unconventional Resources Conference & Exhibition— From Potential to Production, pp. cp-285. (Year: 2012).*

Boone, Kevin, Roger Crickmore, Zabi Werdeg, Carson Laing, and Mathieu Molenaar. "Monitoring hydraulic fracturing operations using fiber-optic distributed acoustic sensing." In Unconventional Resources Technology Conference, San Antonio, Texas, Jul. 20-22, 2015, pp. 316-322. (Year: 2015).*

Ameen, Mohammed S. "Fracture and in-situ stress characterization of hydrocarbon reservoirs: definitions and introduction." Geological Society, London, Special Publications 209, No. 1 (2003): 1-6. (Year: 2003).*

(56) References Cited

OTHER PUBLICATIONS

Rector, J.W., et al—"The Use of an Active Drill Bit for Inverse VSP Measurements", 2018, Exploration Geophysics, vol. 20, Issue 1-2, Abstract only, 5 pgs.
International Search Report, PCT/US2018/031404, dated Jul. 13, 2018, 3 pgs.
Sheather, S.J.—"A reliable data-based bandwidth selection method for kernel density", 1991, Journal of the Royal Statistical Society. Series B (Methodological), pp. 683-690; 9 pgs.
Raterman, Kevin T., et al—"Sampling a Stimulated Rock Volume: An Eagle Ford Example", 2017, Unconventional Resources Technology Conference (URTeC), 2017, URTeC: 2670034, SPE/AAPG/SEG doi.org/10.15530/URTEC-2017-2670034, 18 pgs.
Jin, Ge, et al—"Hydraulic Fracture Geometry Characterization Using Low-Frequency DAS Signal", 2017, The Leading Edge 36(12):975-980—Dec. 2017; 6 pgs.
Wu, K., et al. "Mechanism analysis of well interference in unconventional reservoirs: Insights from fracture-geometry simulation between two horizontal wells," Society of Petroleum Engineers, vol. 33, No. 1, pp. 9 (Feb. 2018).
Awada, A., et al. "Is that interference? A work flow for identifying and analyzing communication through hydraulic fractures in a multiwell pad," SPE Journal, vol. 21, No. 5, pp. 13 (Oct. 2016).
Becker, M.B., et al., "Measuring Hydralic Connection in Fractured Bedrock with Periodic Hydraulic Tests and Distributed Acoustic Sensing," Juounal of Hydrology, pp. 1-11 (Feb. 22-24, 2016).
Boman, K., "DAS technology expands fiber optic applications for oil, gas industry," Rigzone, (May 4, 2015) issue : http://www.rigzone.com/news/oil_gas/a/138405/DAS_Technology_Expands_Fiber_Optic_Applications_for_Oil_Gas_Industry, pp. 4.
Boone, K., et al., "Monitoring Hydraulic Fracturing Operations Using Fiber-Optic Distributed Acoustic Sensing," Unconventional Resources Technology Conference, pp. 8 (2015).
European Search Report for European Application No. EP 17764137.0 dated Mar. 6, 2019.
European Search Report for European Application No. EP 17764143.8 dated Mar. 4, 2019.
European Search Report for European Application No. EP 17764150.3 dated Mar. 4, 2019.
European Search Report for European Application No. EP 17764151.1 dated Mar. 4, 2019.
European Search Report for European Application No. EP17764146.1 dated Mar. 14, 2019.
Grayson, S., et al., "Monitoring acid stimulation treatments in naturally fractured reservoirs with slickline distributed temperature sensing," Society of Petroleum Engineers, pp. 17, (Jan. 2015).
International Search Report with Written Opinion for International Application No. PCT/US2017/021659 dated Jun. 1, 2017, pp. 7.
International Search Report with written opinion dated Jun. 1, 2017 for International Application No. PCT/US2017/021667, pp. 8.
International Search Report with Written Opinion for International Application No. PCT/US2017/021674 dated May 25, 2017, pp. 10.
International Search Report with Written Opinion for International Application No. PCT/US2017/021678 dated Jun. 1, 2017, pp. 7.
International Search Report with Written Opinion for International Application No. PCT/US2017/021679 dated May 25, 2017, pp. 7.
International Search Report with Written Opinion for International Application No. PCT/US2017/021681 dated May 22, 2017, pp. 10.
International Search Report with Written Opinion for International Application No. PCT/US2017/21670 dated May 25, 2017, pp. 6.
International Search Report with Written Opinion for International Application No. PCT/US2018/056327 dated Dec. 21, 2018, pp. 12.
International Search Report with Written Opinion for International Application No. PCT/US2019/030408 dated Jul. 22, 2019, pp. 9.
Johannessen, K., et al. "Distributed Acoustic Sensing—a new way of listening to your well/reservoir," Society of Petroleum Engineers, Society of Petroleum Engineers, pp. 1-9 (Mar. 27-29, 2012).
Le Calvez, J. H., et al. "Real-time microseismic monitoring of hydraulic fracture treatment: a tool to improve completion and reservoir management," Society of Petroleum Engineers, pp. 7 (Jan. 2007).
Lord, D.L., "Study of Performation Friction Pressure Employing a Loarge-Scale Fracturing Flow Simulator," SPE Annual technical Conference and Exhibition, pp. 10 (Sep. 25, 1994).
McKinley, R.M., et al., "Specialized Applications of Noise Logging," Journal of Petroleum Technology, vol. 31, Issue 11, pp. 1387-1395 (Nov. 1979).
McKinley, R.M., et al., "The Structure and Interpretation of Noise From Flow Behind Cemented Casing," Journal of Petroleum Technology, vol. 25, No. 3, pp. 329-338 (Mar. 1973).
Molenaar, M., et al, "First Downhole Application of Distributed Acoustic Sensing (DAS) for Hydraulic Fracturing Monitoring and Diagnostics," Society of Petroleum Engineers, vol. 27, No. 1, pp. 32-38 (Mar. 2012).
Molenaar, M.M., et al., "Real-Time Downhole Monitoring of Hydraulic Fracturing Treatments Using Fibre Optic Distributed Temperature and Acoustic Sensing," Society of Petroleum Engineers, pp. 13 (2012).
European Search Report for European Application No. EP18794756.9 dated Apr. 14, 2020.
Bukhamsin, A., et al., Cointerpretation of distributed acoustic and temperature sensing for improved smart well inflowprofilling. In SPE 180465-MS, Western Regional Meeting. Society of Petroleum Engineers (2016).
Byrd, R. H., et al., A limited memory algorithm for bound constrained optimization. SIAM Journal on Scientific Computing, 16 (5), 1190-1208 (1995).
Curtis, M., et al. (1973). Use of the temperature log for determining flow rates in producing wells. In Fall Meeting of theSociety of Petroleum Engineers of AIME. Society of Petroleum Engineers 4637 (1973).
Dakin, J., Distributed optical fibre Raman temperature sensor using a semiconductor light source and detector. Electronics letters, 21 (13), 569-570 (1985).
Ouyang, L.B., Flow profiling by distributed temperature sensor (DTS) system-expectation and reality. SPE Production& Operations, 21 (02), 269-281 (2006).
Ramey Jr, H., et al., Wellbore heat transmission. Journal of Petroleum Technology, 14 (04), 427-435 (1962).
Van der Horst, et al., Fiber optic sensing for improved wellbore production surveillance. In IPTC 2014: InternationalPetroleum Technology Conference (2014).
Vu-Hoang, D., et al., A novel approach to production logging in multiphase horizontal wells. In SPE 89848, AnnualTechnical Conference and Exhibition. Society of Petroleum Engineers (2004 ).
SPE-168610-MS (2014)-Holley, E.H., et al. "Using Distributed Optical Sensing to Constrain Fracture Models and Confirm Reservoir Coverage in Permian Basin." SPE Hydraulic Fracturing Technology Conference, The Woodlands, Texas, U.S.A., Feb. 4-6.
SPE-153131-PA(2013)-Holley, E.H., et al., "Interpreting Uncemented Multistage Hydraulic-Fracturing Completion Effectiveness By Use of Fiber-Optic DTS Injection Data." SPE Drilling & Completion, 28(3): 243-253.
SPE-107775-PA (2009)-Glasbergen G., et al. "Real-Time Fluid Distribution Determination in Matrix Treatments Using DTS", Society of Petroleum Engineers.
SPE-116182-MS (2008}—Sierra J.R., et al., "DTS Monitoring of Hydraulic Fracturing: Experiences and Lessonsearned", Society of Petroleum Engineers.
SPE-107854-MS (2007}—Tardy, et al., "An Experimentally Validated Wormhole Model for Self-Diverting and: onventional Acids in Carbonate Rocks Under Radial Flow Conditions", Society of Petroleum Engineers.
Ribeiro et al., Detecting Fracture Growth Out of Zone Using Temperature Analysis, Oct. 27-29, 2014, SPE-1707 46-MS, SPEAnnual Technical Conference and Exhibition, Amsterdam, The Netherlands, 24 pp. (Year: 2014).
Hesthammer, J et al. "From seismic data to core data: an integrated approach to enhance reservoir characterization"; 2003; Geological Society, London, Special Publications, 209, pp. 39-54.

(56) References Cited

OTHER PUBLICATIONS

Optasense, "Pipeline Integrity Management: Leak Detection," accessed at https://ace-control.com.sg/wp-content/uploads/2018/11/Pipeline-Integrity-Management-Leak-Detection.pdf, accessed on Jun. 10, 2019, pp. 5.

Ouyang, L-B., et al. "Flow profiling via distributed temperature sensor (DTS) system-expectation and reality," Society of Petroleum Engineers, pp. 14 (2004).

Paleja, R, et al., "Velocity Tracking for Flow Monitoring and Production Profiling Using Distributed Acoustic Sensing," Society of Petroleum Engineers, pp. 16 (Sep. 28-30, 2015).

Portis, D. H., et al., "Searching for the optimal well spacing in the eagle ford shale: A practical tool-kit," Unconventional Resources Technology Conference, pp. 8 (Aug. 12-14, 2013).

Sellwood S.M., et al., "An in-well heat-tracer-test method for evaluating borehole flow conditions," Hydrogeology Journal, Springer, vol. 23, No. 8, pp. 1817-1830 (Aug. 29, 2015).

Webster, P., et al. "Micro-Seismic detection using distributed acoustic sensing," society of Exploration Geophysicists, pp. 5 (Aug. 19, 2013).

Webster, P., et al., "Developments in Diagnostic Tools for Hydraulic Fracture Geometry Analysis," Unconventional Resources Technology Conference, pp. 7 (Aug. 12-14, 2013).

Wheaton, B., et al. "A case study of completion effectiveness in the eagle ford shale using DAS/DTS observations and hydraulic fracture modeling," Society of Petroleum Engineers, pp. 11 (2016).

Silverman, B.W., "Density Estimation for Statistics and Data Analysis", 1986, Monographs on Statistics and Applied Probability, London: Chapman and Hall, 1986; 22 pgs.

\* cited by examiner

STIMULATED ROCK VOLUME ANALYSIS

PRIOR RELATED APPLICATIONS

This application claims priority to U.S. Ser. No. 62/501,820 filed May 5, 2017, and U.S. Ser. No. 62/519,450 filed Jun. 14, 2017, entitled "Stimulated Rock Volume Analysis." Each of these applications is incorporated by reference for all purposes.

FEDERALLY SPONSORED RESEARCH STATEMENT

Not applicable.

FIELD OF THE DISCLOSURE

The disclosure relates generally to hydraulic fracturing. In particular, a data acquisition program using core, image log, microseismic, Distributed Temperature Sensing (DTS), Distributed Acoustic Sensing (DAS), and pressure data is used to monitor stimulation operations.

BACKGROUND OF THE DISCLOSURE

Unconventional reservoirs include reservoirs such as tight-gas sands, gas and oil shales, coalbed methane, heavy oil and tar sands, and gas-hydrate deposits. These reservoirs have little to no porosity, thus the hydrocarbons may be trapped within fractures and pore spaces of the formation. Additionally, the hydrocarbons may be adsorbed onto organic material of a e.g. shale formation. Therefore, such reservoirs require special recovery operations outside the conventional operating practices in order to mobilize and produce the oil.

The rapid development of extracting hydrocarbons from these unconventional reservoirs can be tied to the combination of horizontal drilling and induced fracturing (call "hydraulic fracturing" or simply "fracking") of the formations. Horizontal drilling has allowed for drilling along and within hydrocarbon reservoirs of a formation to better capture the hydrocarbons trapped within the reservoirs. Additionally, increasing the number of fractures in the formation and/or increasing the size of existing fractures through fracking increases hydrocarbon recovery.

In a typical hydraulic fracturing treatment, fracturing treatment fluid is pumped downhole into the formation at a pressure sufficiently high enough to cause new fractures or to enlarge existing fractures in the reservoir. Next, frack fluid plus a proppant, such as sand, is pumped downhole. The proppant material remains in the fracture after the treatment is completed, where it serves to hold the fracture open, thereby enhancing the ability of fluids to migrate from the formation to the well bore through the fracture. The spacing between fractures as well as the ability to stimulate fractures naturally present in the rock may be major factors in the success of horizontal completions in unconventional hydrocarbon reservoirs.

While there are a great many fracking techniques, one useful technique is "plug-and-perf" fracking. Plug-and-perf completions are extremely flexible multistage well completion techniques for cased hole wells. Each stage can be perforated and treated optimally because the fracture plan options can be modified in each stage. The engineer can apply knowledge from each previous stage to optimize treatment of the current frack stage.

The process consists of pumping a plug-and-perforating gun to a given depth. The plug is set, the zone perforated, and the tools removed from the well. A ball is pumped downhole to isolate the zones below the plug and the fracture stimulation treatment is then pumped in, although washing, etching, and other treatments may occur first depending on downhole conditions. The ball-activated plug diverts fracture fluids through the perforations into the formation. After the fracture stage is completed, the next plug and set of perforations are initiated, and the process is repeated moving further up the well.

Improvements in recovery using fracking depend on fracture trajectories, net pressures, and spacing. Thus, the ability to monitor the geometry of the induced fractures to obtain optimal placement and stimulation is paramount. An induced fracture may be divided into three different regions (hydraulic, propped, and effective), but out of the three fracture dimensions, only the last one is relevant to a reservoir model, and may be used to forecast future production.

Thus, what is needed in the art are improved methods of evaluating the hydraulic fracturing for every well being hydraulically stimulated. Although hydraulic fracturing is quite successful, even incremental improvements in technology can mean the difference between cost effective production and reserves that are uneconomical to produce.

SUMMARY OF THE DISCLOSURE

Described herein is a data acquisition program, which includes core, image log, microseismic, Distributed Temperature Sensing (DTS), Distributed Acoustic Sensing (DAS), and pressure data, for observing the reservoir state preceding and following hydraulic fracturing, and methods of use in fracturing and producing hydrocarbon. Specifically, the hydraulic fracturing process can be characterized using a variety of techniques to sample of the stimulated rock volume (SRV) at various locations to improve fracturing stimulations and improve hydrocarbon recovery. The integration of the techniques allows for improved characterization of the SRV and stimulated fractures, and ultimately, an improvement in the fracturing process. Further, the disclosed program is able to package the results for use with other commercial software.

The oil and gas industry came up with the concept of the stimulated rock volume (SRV) as an empirical replacement for reliable modeling of highly complex fracture networks. The SRV represents the total volume of reservoir rock that has been hydraulically fractured and its calculations are based almost exclusively on the location of microseismic events recorded during stimulation. However, methods to elucidate the extent of the stimulation of the reservoir rock provide little details.

The most commonly used method to characterize the SRV is microseismic measurement, which locates and records microseismic events and is used to map fracture density. However, microseismic measurements have a few disadvantages. First, it is an indirect method, as microseismicity captures the shear failure of well stimulation, but not tensile opening of the hydraulic fracture itself. In addition, the physical meaning of microseismic events and how they relate to the hydraulic fracture is still widely debated in the literature. Further, the method is subject to a significant uncertainty in the location of the microseismic events. As such, by itself, this method does not accurately characterize a hydraulic fracturing procedure or SRV.

Thus, Applicants developed a method for combining microseismic measurements with other methods to accurately sample SRV and characterize fracking. Most of these methods are commonly employed in wells and thus do not add additional costs to the stimulation characterization. For instance, core, image logs, and pressure data are also common logs performed during hydrocarbon recovery methods. For fracking stimulations, these methods can aid in determining fracture orientation and width.

Other methods that are integrated by the program are not, historically, as commonly used, but are quickly becoming common place for other well applications as technology allows. These include Distributed Acoustic Sensing (DAS) and Distributed Temperature Sensing (DTS).

DAS is the measure of Rayleigh scatter distributed along the fiber optic cable. In use, a coherent laser pulse from an interrogator is sent along the optic fiber and scattering sites within the fiber itself causes the fiber to act as a distributed interferometer with a pre-set gauge length. Thus, interactions between the light and material of the fiber can cause a small amount of light to backscatter and return to the input end, where it is detected and analyzed. Acoustic waves, when interacting with the materials that comprise the optical fiber, create small changes in the refractive index of the fiber optic cable. These changes affect the backscatter characteristics, thus becoming detectable events. Using time-domain techniques, event location is precisely determined, providing fully distributed sensing with resolution of 1 meter or less.

Applicant has previous used DAS in a variety of fracturing monitoring in U.S. Ser. Nos. 15/453,650, 15/453,216, 15/453,584, 15/453,434, 15/453,730, 15/453,044, all of which are incorporated herein for all purposes.

Distributed Temperature Sensing (DTS) technology also includes an optical fiber disposed in the wellbore (e.g. via a permanent fiber optic line cemented in the casing, a fiber optic line deployed using a coiled tubing, or a slickline unit). The optical fiber measures a temperature distribution along a length thereof based on an optical time-domain (e.g. optical time-domain reflectometry (OTDR), which is used extensively in the telecommunication industry). One advantage of DTS technology is the ability to acquire, in a short time interval, the temperature distribution along the well without having to move the sensor as in traditional well logging, which can be time consuming. DTS technology effectively provides a "snap shot" of the temperature profile in the well.

Thus, disclosed herein is a data acquisition program or method that collects and combines core, image log, microseismic, DAS, DTS, and pressure data into an easy to interpret format. Further, the data can be exported in a format usable by commercial oil and gas software. The output of the disclosed program can also be combined with other techniques to monitor all aspects of the fracturing process.

It should be noted that cross well seismic data is not included in the program because it is risky and produces inconclusive results. Further, gas is needed as a contrast agent in fractures and liquid filled propped fractures are acoustically invisible.

Further, to collect the required cross well seismic data, each producer well would need 2-3 monitoring wells for base state characterization (log, core data), pressure monitoring (pre- and post-fracturing) and microseismic monitoring. Also, 3-5 drill-through wells would be needed for disturbed state characterization (log, partial core) and 'smart' completions (local pressure monitoring/interference testing and injection). By contrast, pressure gauges, DTS, traced proppants, production logs, and pressure transient data can all be acquired from the producer well.

In some embodiments, data from stimulations of multiple producer wells are combined to properly characterize the stimulated fractures and the SRV.

The programs and methods described utilize non-transitory machine-readable storage medium, which when executed by at least one processor of a computer, performs the steps of the method(s) described herein.

Due to the nature of the data pre- and post-transform, parallel computing and data storage infrastructure created for data intensive projects, like seismic data processing, are used because they can easily handle the complete dataset. Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system. Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Alternatively, many-cores can be used in the computing. A Linux based multi-core cluster has been used to process the data in the examples described herein.

The disclosed methods include any one or more of the below embodiments in any combination(s) thereof:

In one embodiment, a method of optimizing the production scheme of a hydrocarbon-containing reservoir includes collecting image log, microseismic, Distributed Temperature Sensing (DTS), Distributed Acoustic Sensing (DAS), and pressure data from at least one observation well in a hydrocarbon-containing reservoir to form a pre-stimulation data set; while fracturing at least one well in a first fracture stimulation stage according to pre-determined fracturing parameters to form a set of fractures; collecting image log, microseismic, Distributed Temperature Sensing (DTS), Distributed Acoustic Sensing (DAS), and pressure data from at least said observation well in a hydrocarbon-containing reservoir to form a strain response data set; identifying said set of fractures formed in step b) from said strain response data set; characterizing the complexity of said set of fractures; updating said pre-determined fracturing parameters based on said characterizing step; and, performing a second fracturing stimulation stage.

In another embodiment, a method of recovering hydrocarbons from a hydrocarbon-containing reservoir is described by drilling at least one producer well; drilling at least one observation well; installing a plurality of sensors for distributed acoustic sensing, microseismic monitoring and a plurality of pressure gauges in each observation well; obtaining, microseismic, pressure, and DAS data from said observation well to form a pre-stimulation data set; while fracturing at least one producer well in a first fracture stimulation stage according to pre-determine fracturing parameters to form a set of fractures; obtaining, microseismic, pressure and DAS data from said observation well to form a stimulation data set; identifying said set of fractures formed in said fracturing step by comparing said pre-stimulation data set and post-stimulation data; characterizing the complexity of said set of fractures; updating said pre-determined fracturing parameters based on said characterizing step; and, performing a second fracturing stimulation stage; and, producing hydrocarbons.

In another embodiment, aA computer-implemented method for modeling the stimulated reservoir volume (SRV) of a hydrocarbon-containing reservoir, is described which includes drilling at least one producer well into an area of said reservoir to be stimulated; drilling at least one observation monitoring well in said reservoir; installing a plurality of sensors for microseismic monitoring and a plurality of pressure gauges in each observation well; installing one or more fiber optic cables for Distributed Acoustic Sensing (DAS) in said observation wells, wherein said fiber optic cables are attached to interrogators obtaining, before stimulation image log data, microseismic, pressure and DAS data from said observation well to form a pre-stimulation data set; while fracturing at least one producer well in a first fracture stimulation stage according to pre-determine fracturing parameters to form a set of fractures; obtaining, during stimulation image log data, microseismic, pressure and DAS data from said observation well to form a pre-stimulation data set; identifying said set of fractures formed in said fracturing step by comparing said pre-stimulation data set and post-stimulation data; characterizing the complexity, length, branching, density and other parameters of said set of fractures; and, modeling said SRV using said characterization of said set of fractures.

In another embodiment, a computer program product embodied on a computer readable storage medium for characterizing a hydraulic fracturing stimulation, is described where integrated core data, image log data, microseismic data, Distributed Temperature Sensing (DTS) data, Distributed Acoustic Sensing (DAS) DATA, and pressure data from a prefractured zone of a reservoir, integrated core data, image log data, microseismic data, Distributed Temperature Sensing (DTS) data, Distributed Acoustic Sensing (DAS) DATA, and pressure data during fracturing of a reservoir, computer code for estimating a stimulated rock volume (SRV) that is being fractured from the data in a) and b).

These methods may be used to increase hydrocarbon production over wells where the method is not used. In some instances the image log and/or microseismic data samples a stimulated rock volume (SRV). The observation well may be a vertical well drilled near the production well or the observation well may be one or more adjacent producer wells. The observation well may collect data from one or more adjacent producer wells. The methods described herein may be used for modeling the stimulated reservoir volume (SRV) of said reservoir. In some embodiments, the method may be repeated literately updating the model of the SRV.

Any method described herein, including the further step of printing, displaying or saving the initial, intermediate or final (or both) datasets of the method to a non-transitory computer readable memory.

Any method described herein, further including the step of using the final datasets in a reservoir modeling program to predict reservoir performance characteristics, such as fracturing, production rates, total production levels, rock failures, faults, wellbore failure, and the like.

Any method described herein, further including the step of using said final datasets to design, implement, or update a hydraulic fracturing program in a similar reservoir, in a similar producer well, or in subsequent fracturing stages of said reservoir.

Any method described herein, further including the step of producing hydrocarbon by said reservoir.

This summary is provided to introduce a selection of concepts that are further described below in the detailed description. This summary is not intended to identify key or essential features of the claimed subject matter, nor is it intended to be used as an aid in limiting the scope of the claimed subject matter.

"Fracking", as used herein, may refer to any human process used to initiate and propagate a fracture in a rock formation, but excludes natural processes that fracture formation, such as natural seismic events. The fracture may be an existing fracture in the formation, or may be initiated using a variety of techniques known in the art. "Hydraulic Fracking" means that pressure was applied via a fluid.

As used herein, "fracture parameters" refers to characteristics of fractures made using hydraulic fracking and includes fracture growth, fracture height, fracture geometry, isolation conditions between stages, stress shadows and relaxation, fracture spacing, perforation cluster spacing, number of perforation clusters/stage, well spacing, job size, pumping pressure, heel pressure, proppant concentration, fluid and proppant distribution between perforation clusters, pumping volume, pumping rate and the like.

As used herein, a "fracture model" refers to a software program that inputs well, rock and fracturing parameters and simulates fracturing results in a model reservoir. Several such packages are available in the art, including SCHLUMBERGERS® PETREL® E&P, FRACCADE® or MANGROVE® software, STIMPLAN™, tNAVIGATOR™, SEEMYFRAC™, TERRAFRAC™, ENERFRAC®, PROP®, FRACPRO™, ROCKFIELD ELFEN™, ALTAIR GEOD™, Barree & Associates GOHFER®, and the like. For shale reservoirs, FRACMAN™ and MSHALE™ may be preferred. These models can be used with appropriate plugins or modifications needed to practice the claimed methods.

By "fracture pattern", we refer to the order in which the frack zones are fractured.

The term "fracture complexity" refers to the degree of entanglement (or lack thereof) in the induced fractures. Fractures can range from simple planar fractures to complex planar fractures and network fracture behavior. Further, the fracture complexity can change from near-well, mid-field, and far-field regions.

As used herein, the "Gaussian Kernel" or "radial basis function kernel" aka "RBF kernel" is a popular kernel function used in various kernelized learning algorithms. In particular, it is commonly used in support vector machine classification.

As used herein, a "drill through well" a well whose trajectory is deliberately planned to sample some portion of the SRV.

As used herein, a "monitoring" well is a well nearby a producer that is used to monitor a producer. It produces samples and data for control purposes.

As used herein, "single well seismic imaging" or "SWSI" is the application of borehole seismic sources and receivers on the same string within a single borehole in order to acquire CMP type shot gathers. "Cross well" seismic places sources and receivers in adjacent wells in order to image the interwell volume.

The term "many-core" as used herein denotes a computer architectural design whose cores include CPUs and GPUs. Generally, the term "cores" has been applied to measure how many CPUs are on a giving computer chip. However, graphic cores are now being used to offset the work of CPUs. Essentially, many-core processors use both computer and graphic processing units as cores.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| SRV | simulated rock volume |
| DTS | Distributed Temperature Sensing |
| DAS | Distributed Acoustic Sensing |
| G | gauges |
| bbl | oil barrel |
| P | producer well |
| S | data well |
| ST | Sidetrack |
| FMI-HD | Fullbore Formation Microimager-High Definition |
| CT | Computer tomography |
| TVD | True vertical depth |
| NE | Northeast |
| SW | Southwest |
| DFIT | Diagnostic Fracture Injection Testing |
| SEM | Scanning electron micrograph |

BRIEF DESCRIPTION OF DRAWINGS

The application file contains at least one drawing executed in color. Copies of this patent application publication with color drawing(s) will be provided by the Office upon request and payment of the necessary fee.

FIG. 7A-C. DAS injection monitoring, wherein FIG. 7A shows the injected slurry volume for each stage; FIG. 7B is an example of the DAS data from stage 5; and FIG. 7C is a summary of hydraulic stimulation injection data.

FIG. 9A showing dipping fractures in core. FIG. 9B showing the same section of CT image as an unwrapped circumferential image. FIG. 9C showing 18 ft section of FMI-HD™ image log containing several fracture doublets and triplets showing up as dark sinusoids across image.

FIG. 10A is a core photograph; FIG. 10B is the unwrapped circumferential CT scan of cored section; FIG. 10C is the FMI-HD™ image of cored section; and, FIG. 10D shows one hydraulic fracture swarm consisting of 22 fractures in a 20 ft section of the well.

DETAILED DESCRIPTION

The invention provides a novel data acquisition program or method for monitoring hydraulic fracturing and sampling stimulation rock volume (SRV). Specifically, the data acquisition program integrates core, image log, microseismic, DTS/DAS, and pressure data to monitor a reservoir before and after fracturing. In more detail, the data acquisition program characterizes the hydraulic fracture and SVR by:

Sampling the SRV via a drill-through well (logs and core). Spatially limited but detailed, high fidelity fracture and SRV data.

Active and passive seismic imaging.

Microseismic event location and size.

"Low" resolution images of larger reservoir volume before and after fracturing.

Calibrate to detailed drill through well data.

Pressure monitoring, tracing and pressure build-up/interference.

Identify hydraulic connections.

Estimate fracture conductivity.

Far field pressure response during production and interference testing.

Model inferred fracture description that matches production and pressure behavior.

The integrated characterization by the data acquisition program can then be used to update fracturing simulations or parameters to improve oil recovery and can be combined with other techniques to accurately monitor and conduct well stimulation.

The present invention is exemplified with respect to the Shale 1 Pilot described below; however, this is exemplary only, and the invention can be broadly applied to an unconventional reservoir that requires hydraulic fracturing stimulations. The following examples are intended to be illustrative only, and not unduly limit the scope of the appended claims.

Shale 1 Pilot

The described data acquisition program was applied to a pilot area on a shale reservoir, hereinafter referred to as Shale 1, in Texas. The Shale 1 reservoir was chosen because it was an active play that was well characterized and had established field procedures.

Figure 1:
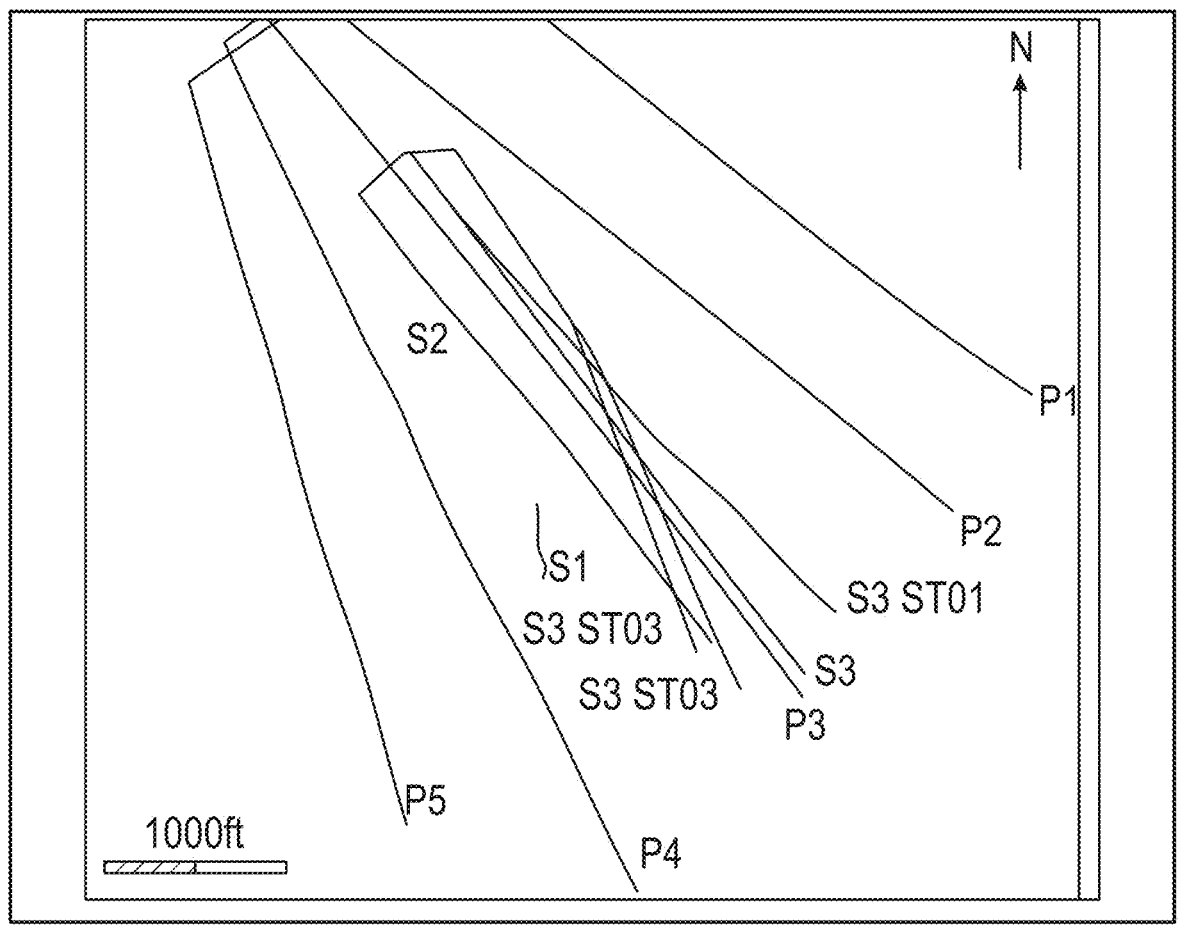
FIG. 1. Pilot well lay-out, map view.

The design of the pilot area is shown in FIG. 1. The pilot area consisted of 4 producers, P2, P3, P4 and P5 landed at the same level in the Cretaceous Lower Shale 1, one vertical far field pressure monitoring well, and 5 deviated observation wells to characterize the stimulated rock volume at different locations adjacent to one of the stimulated producers, the P3 well. The wells were drilled in 2014 and 2015 adjacent to an existing producer, P1.

The pilot area was structurally quiet with beds dipping gently to the southeast at 3° without seismically mappable faulting. Shale 1 is overlain by the Austin Chalk and underlain by the Buda Limestone. The lower portion of Shale 1 in the pilot area consists primarily of thinly interbedded organic marl, marly limestone and limestone beds. The upper portion of Shale 1 above the pilot area is a calcareous mudstone.

The 4 producers were drilled from a single pad, down dip, parallel to bedding in a fan-shaped arrangement with well-spacing being approximately 400 ft. at the heel and 1,200 ft. at the toe (FIG. 1). All were landed at the same stratigraphic depth, approximately 70 ft. above the Buda Limestone. The P3 well was instrumented with fiber optic cables for bottom hole pressure and Distributed Temperature Sensing (DTS) and Distributed Acoustic Sensing (DAS) for monitoring during completion and production. The P2, P4 and P5 were not instrumented down hole, but were monitored at the surface.

Three data wells were drilled next to P3. S1 is a vertical well drilled approximately 615 ft. to the southwest of P3. A standard log suite was acquired to establish stratigraphy for geosteering. Additionally, the Borehole Acoustic Reflection Survey (BARS™) and Next Generation Imager (NGI™) logs were obtained for fracture characterization. S1 was designed for simultaneous pressure and microseismic monitoring. Fiber optic cable was installed on casing for monitoring DTS/DAS and reservoir pressure throughout the Shale 1 interval and into the Austin Chalk. During the stimulation of P2 and P3, geophones were placed in this well as part of a dual well microseismic acquisition.

The S2 and S3 wells were landed about half way along P3 to sample the SRV in the central-to-toe region, adjacent to stages 1-7. S2 was drilled before the hydraulic stimulation of the producers to characterize the native state of fracturing in the pilot area. It was 30 ft. TVD above and approximately 200 ft. southwest of the P3. Lateral length is 1,270 ft. Two hundred feet of three-inch diameter horizontal core and an FMI-HD™ log were taken in this well. S3, which was sidetracked three times, was used to sample the SRV at different spatial locations around P3 post-stimulation.

Cuttings were collected and examined for the presence of proppant in all post-stimulation wells. The sidetracked laterals were 1,300 to 1,700 ft. long. Pipe conveyed FMI-HD™ image logs were run in all sampling wells for fracture characterization. The original S3 wellbore was parallel to, 30 ft. TVD above, and 70 ft. northeast of the P3, and 360 ft. of three-inch diameter, horizontal core was taken from this well.

After logging, the lateral was cemented and abandoned using a disposable tubing string. This drilling and abandonment procedure was repeated for S3_STO1 and S3_STO2.

STO1 was drilled at the same stratigraphic level as the original S3 lateral. The sidetrack initiated approximately 130 ft. northeast of the producer and sampled outward to 360 ft. from P3. The second and third sidetracks landed approximately 210 ft. to the northeast and 100 ft. above P3 and both crossed above it.

STO2, remained 100 ft. above the producer along its entire length with a TD approximately 105 ft. southwest of the producer, whereas STO3 cut down through the section, crossed 56 ft. above the producer to a TD approximately 30 ft. below and 250 ft. to the southwest of P3. 120 ft. of three-inch diameter core were taken from STO3, roughly 40 ft. above the core taken in the original S3 lateral.

Figure 2:
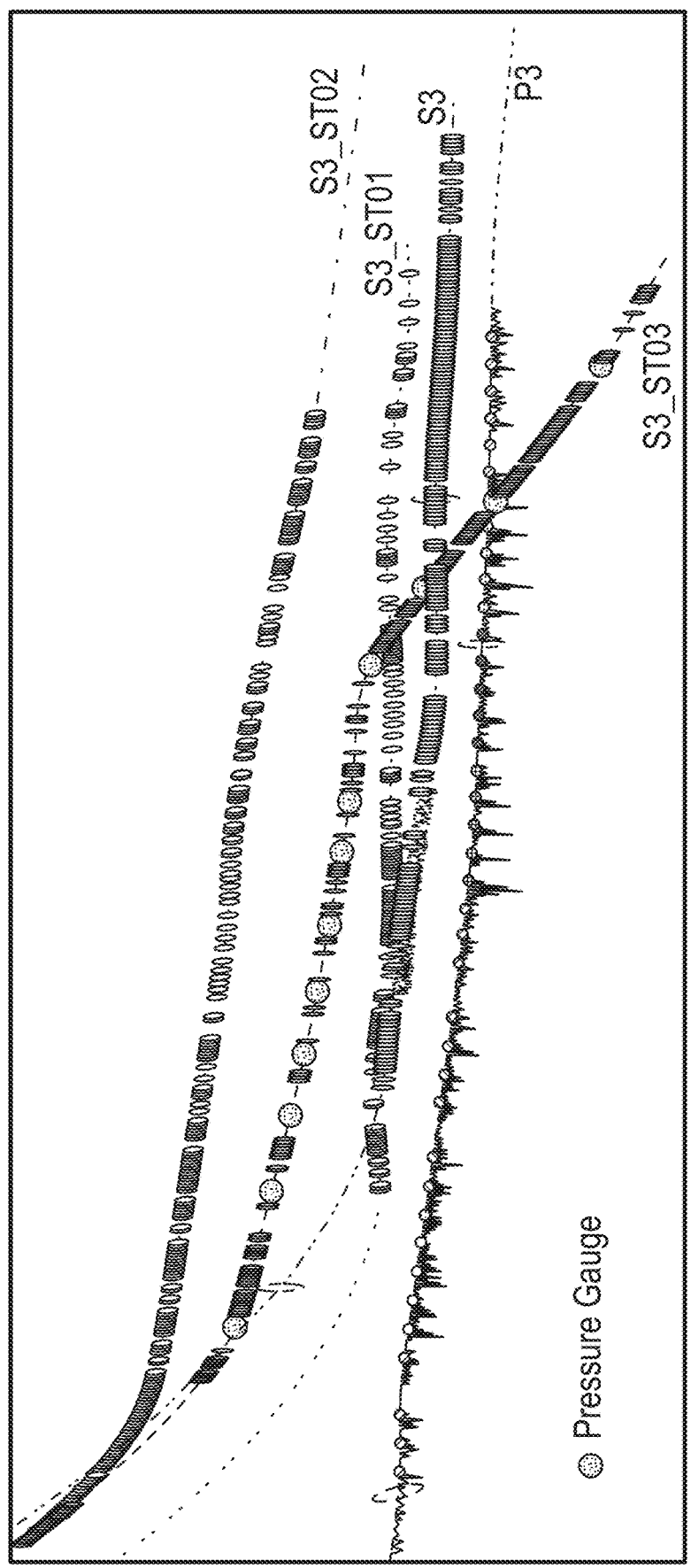
FIG. 2. Well paths showing hydraulic fractures as white discs. Cored intervals are shown in pink. Pressure/temperature gauge location in S3 shown by red circles Yellow filled log on P3 is Scandium RA tracer log. Blue discs show locations of iridium RA tracer from offset producer P2.

The S3_STO3 well was cased and cemented to serve as a long-term far-field pressure monitoring well. Twelve externally mounted pressure gauges were installed along the length of the lateral. Distances from gauge to the P3 producer ranged from 50 to 280 ft. In S1, the 7 pressure/temperature gauges were installed from just above the Buda Formation up into the lower Austin Chalk using the cement annulus as isolation. Each gauge was in a casing mounted carrier connected by a snorkel tube to an externally mounted perforating gun assembly. After deployment, the guns were fired outward to connect the pressure gauges to the formation. Unfortunately, while all seven gauges remained functional, only three were successfully hydraulically connected to the formation. FIG. 2 displays the well paths showing the hydraulic fractures as discs and locations of the gauges.

Pilot field operations took place in two phases over two years. In the first phase, the producers and sample wells S1 and S2 were drilled and completed. The producers were then stimulated and put on production for one month before sample well S3 was drilled. Phase 2 consisted of the 3 sidetracks from S3 and was performed after a year of production.

Completion Monitoring

The disclosed data acquisition program for Shale 1 pilot relied heavily on spatial sampling adjacent to a horizontal producer, both before and after hydraulic stimulation, to characterize the state of hydraulic fracturing. Remote monitoring by microseismicity and Distributed Acoustic and Temperature Sensing (DAS/DTS) were an integral part of the program design. Furthermore, the design employed multiple pressure gauges to monitor the spatial progress of depletion with the intent to tie production performance to observed fracture characteristics.

Thus, this multiwell stimulation was monitored by various means including: dual well microseismic; continuous distributed acoustic sensing (DAS) and distributed temperature sensing (DTS) in P3; and pressure response in multiple gauges in S1 and P3. The various monitoring means were integrated into an easy to view format allowing for quick decisions on the fracturing program parameters.

In more detail, borehole microseismic data was recorded during stimulation of the P2 and P3 using high temperature borehole geophones clamped to the inside of casing in vertical monitor well S1 and through the build section of a horizontal monitor well S2. Both arrays consisted of twelve geophones spaced at 100 ft intervals. In the vertical monitor well, the bottom geophone was placed 100 feet above the top of the Buda and the array extended vertically 1100 ft. All geophones were at or above the level of the producers. Downhole conditions of 325° F. exceeded the rated maximum temperature/pressure conditions for the geophone arrays and thus, geophones were frequently replaced.

In all, 26 of the 28 stages in P2 and P3 were microseismically monitored from at least one of the monitoring wells and the events from six stages in P3 closest to the sample wells were recorded on both arrays. Industry standard event detection and location routines were used to obtain robust dual well location solutions for the 6 stages offsetting the sample wells, and a combination of single and dual well solutions were obtained for the remaining stages. These differences in microseismic acquisition and processing, led to variation in the completeness of event detection and the accuracy of event location over the monitored area; however, the greatest confidence in event locations were assigned to the immediate pilot study area.

Figure 3:
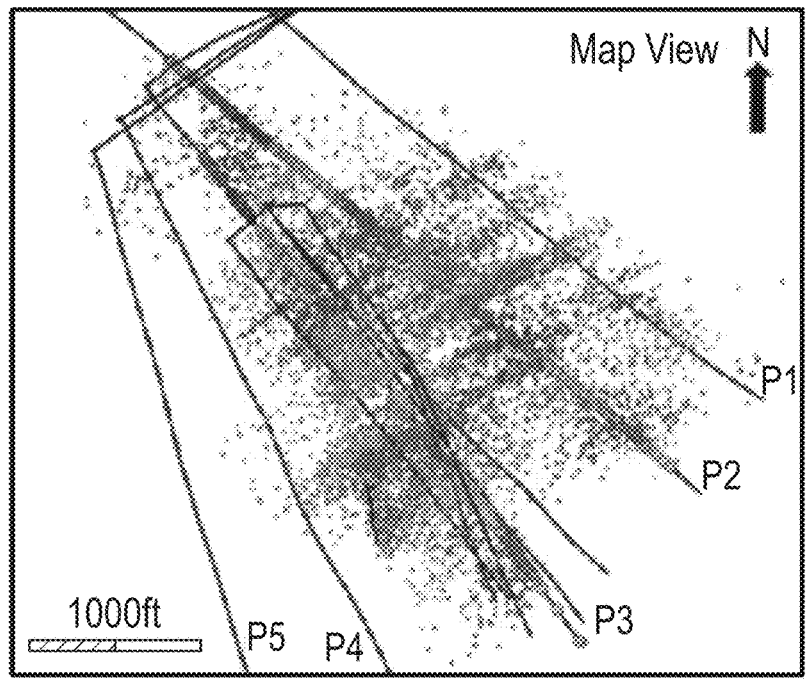
FIG. 3. Map view and cross-section view of microseismic events.
Figure 3:
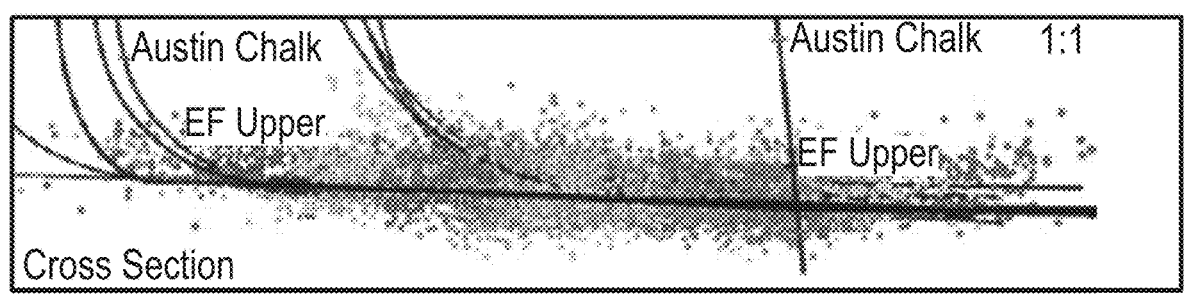

Vertically, half of the microseismic events are contained within an interval from 15 ft below to 115 ft above the P2 and P3 wells. A lack of events in the Buda limestone suggested that formation behaved as a barrier to downward fracture propagation. The density of microseismic events were greatest at the wellbore and decrease spatially away from the stimulated well (FIG. 3). Stage event patterns ranged from linear to dispersed.

The central stages of the laterals show NE/SW trending linear event clustering features which extend over 1,000 ft from the stimulated wells and cross P1, P2 and P3. This clustering was perpendicular to the minimum horizontal in-situ stress and was thus parallel to the predicted plane of hydraulic fracturing. The linear event clustering features are a result of events recorded during multiple stages and sometimes consisted of co-located events from both the P2 and P3 stimulation.

When the microseismic events were examined stage-by-stage, it was apparent that, in some stages, events occur both uphole and downhole of the stage being stimulated. A significant amount of microseismic activity recorded during the stimulation of the P2 was located along the P1 well, which had been stimulated and produced for one year prior to the pilot activities.

Few microseismic events were recorded in the heel and toe areas of P2 and P3. The lack of events in the heel region was likely the result of poor geophone location for imaging this area. Considering observations from previous microseismic surveys that consistently show a high level of activity in the near wellbore region, the paucity of events in the toe region of P3 was puzzling.

Microseismic events also extended to the S1 well, which had a vertical pressure gauge array and was 615 feet from P3. As FIG. 4 indicates, the recording of microseismic events positioned within 100 feet of S1 preceded and persisted throughout the pressure response registered in the three gauges successfully connected to the reservoir (G3, G5 and G6). The absolute maximum-recorded pressure in the connected gauges exceeded the minimum stress of 11,960 psi estimated by DFIT from an adjacent well. Hence, it is interpreted that a hydraulic fracture or fractures intersected or were proximal to S1. Significantly, the pressure event was associated with a compressional heating event recorded in all 7 gauges. Given that the magnitude of heating was similar in gauges 1 through 6, it is likely that the fracture extended throughout the Shale 1 interval.

Figure 4:
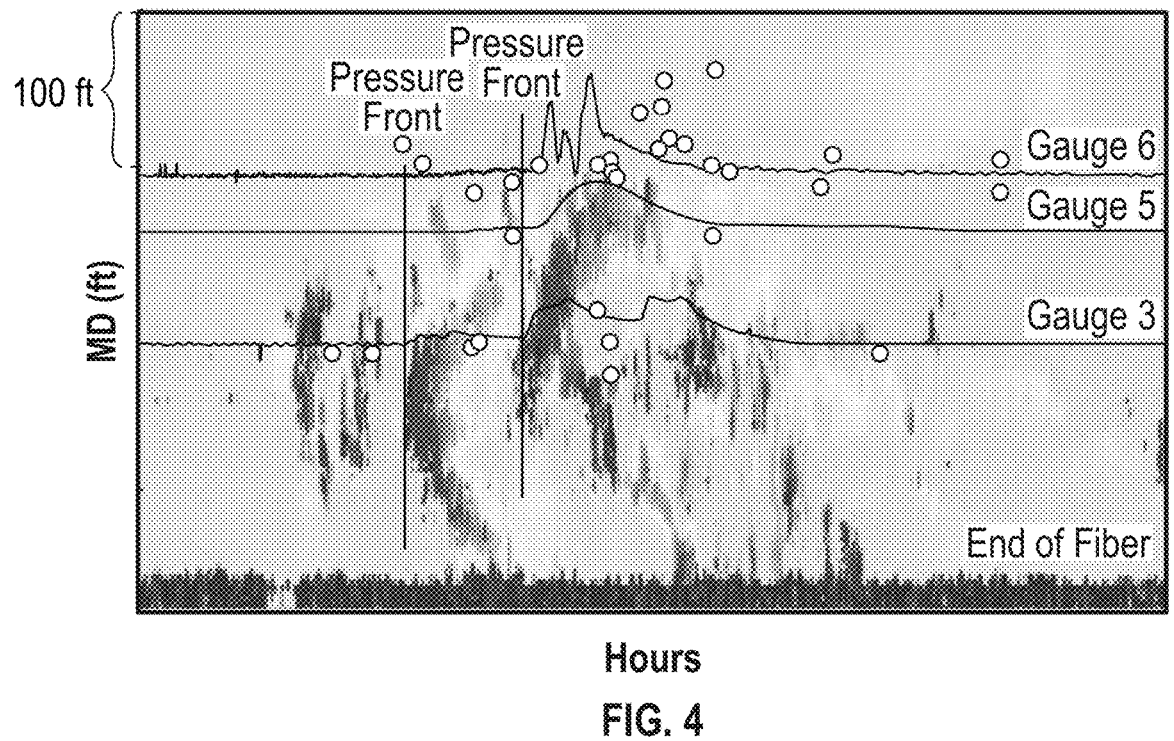
FIG. 4. Microseismic and pressure at S1.

FIG. 4 also shows the DAS response at the S1. The DAS signal is highly sensitive to temperature and mechanical strain changes. In this instance, the fiber was used to analyze the strain response at S1 imparted by stimulating the P3. The first DAS arrival was consistent with the first recorded local microseisms in time and depth. Subsequent DAS arrivals agreed spatially and temporally with recorded pressure and temperature events, which were interpreted above as fracture arrivals. Given that it provides precise position data, the spatial resolution of fracture height was extended to the base of the Austin Chalk at the S1 location.

The DAS fiber in P3 was also used to analyze strain changes during the stimulation of the adjacent producers. The fiber is mechanically coupled with the formation, thus strain rate along the P3 wellbore during hydraulic fracturing of the offset producers can be calculated and tied back to formation deformation. Where the fiber is in the path of a hydraulic fracture, it was extended.

Figure 5:
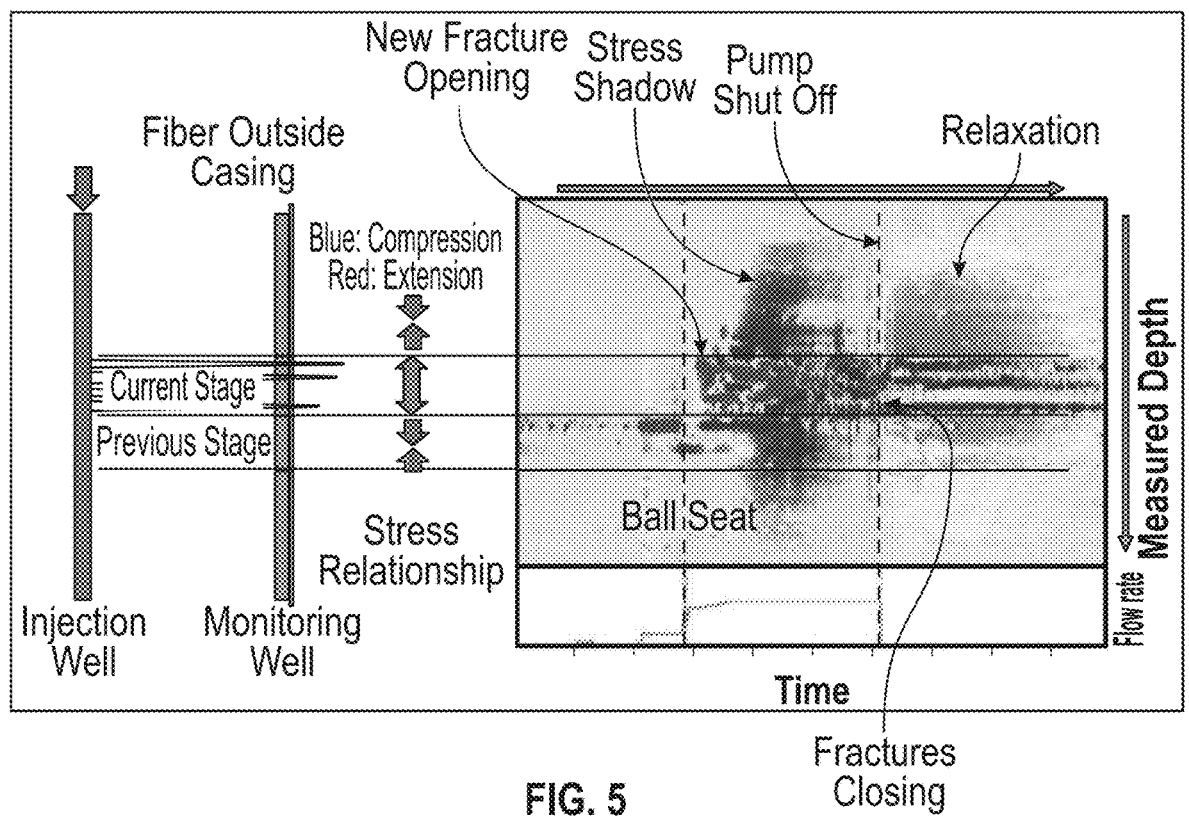
FIG. 5. Strain rate in S3 from DAS during stimulation of offset producer. The red signal denotes fiber extension and blue denotes fiber compression.

On either side of the hydraulic fracture, the fiber and coupled formation were compressed, or stress shadowed. This is illustrated in FIG. 5, which shows an example of a recorded signal at P3 during stimulation of an offset producer. In this figure, the red signal denotes fiber extension and blue denotes fiber compression.

Figure 6:
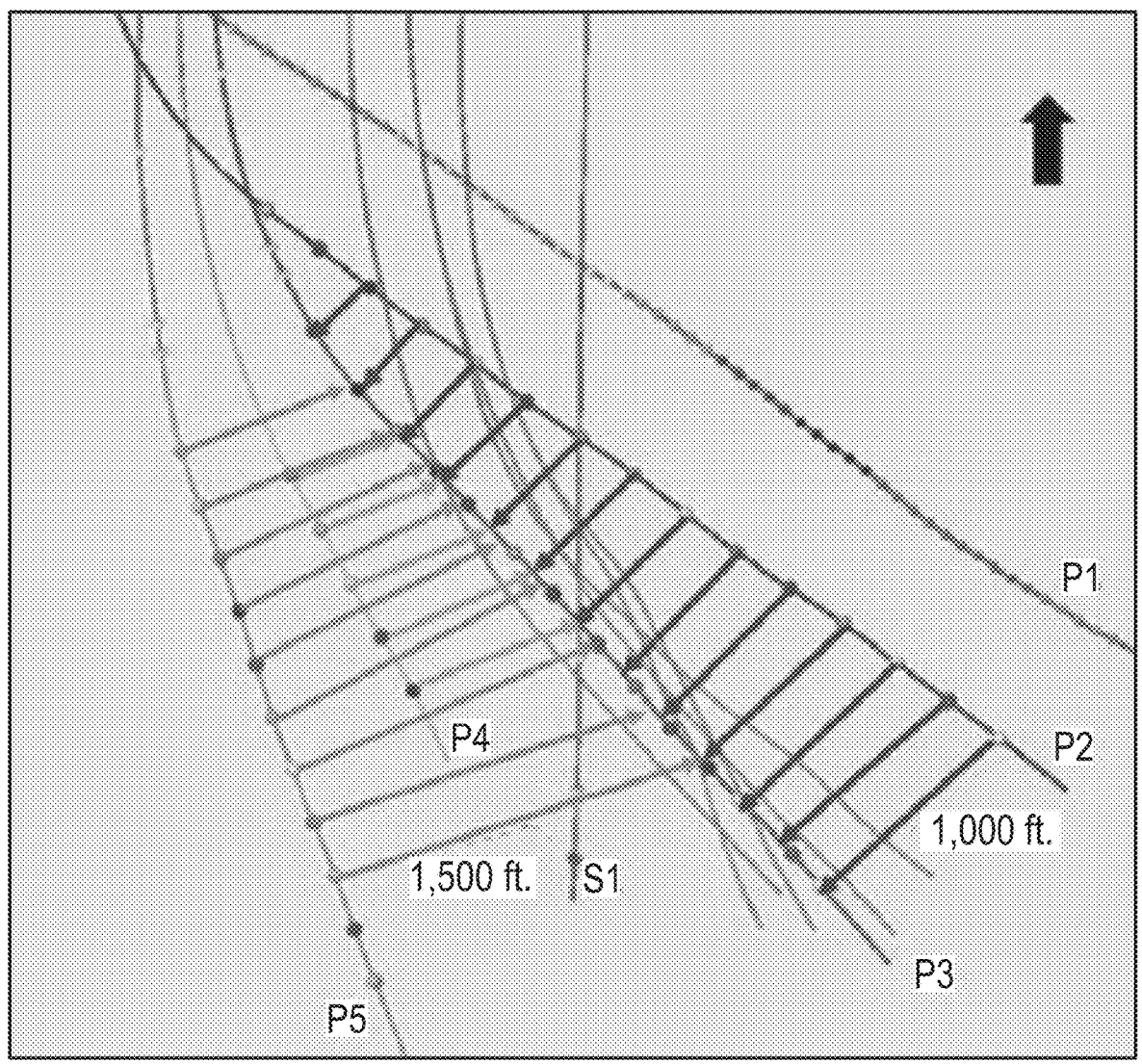
FIG. 6. Cross well DAS response indicating that some fractures extend 1,500 ft.

The response in the offset well correlated with the fluid and proppant injection timing. A set of extension signals interpreted to be 'new fracture opening' (in red) were observed within a short delay of onset of pumping, which is surrounded by the compression signal from the stress shadowing of the formation. The signal was reversed when pumping stops resulting in 'fractures closing' (in blue) surrounded by a relaxation of stress in surrounding formation. The location and number of fracture hits observed can be correlated back to the perf clusters for each stage on the stimulation well to provide information on SRV geometry (FIG. 6). Note that some of the fractures extend for 1,500 ft. There is an absence of signal from the toe stages of P5 because these stages were not monitored.

Figure 7B:
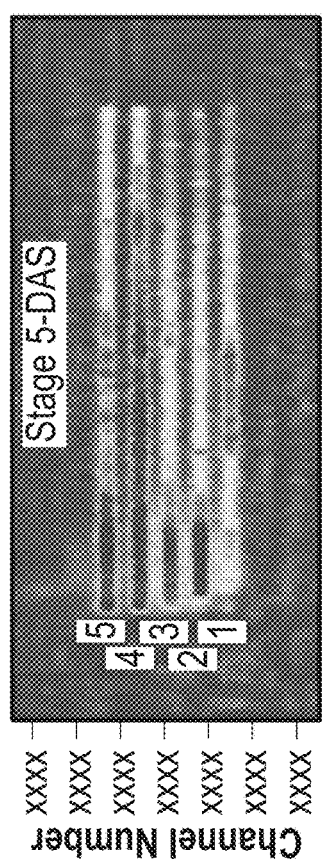
Figure 7C:
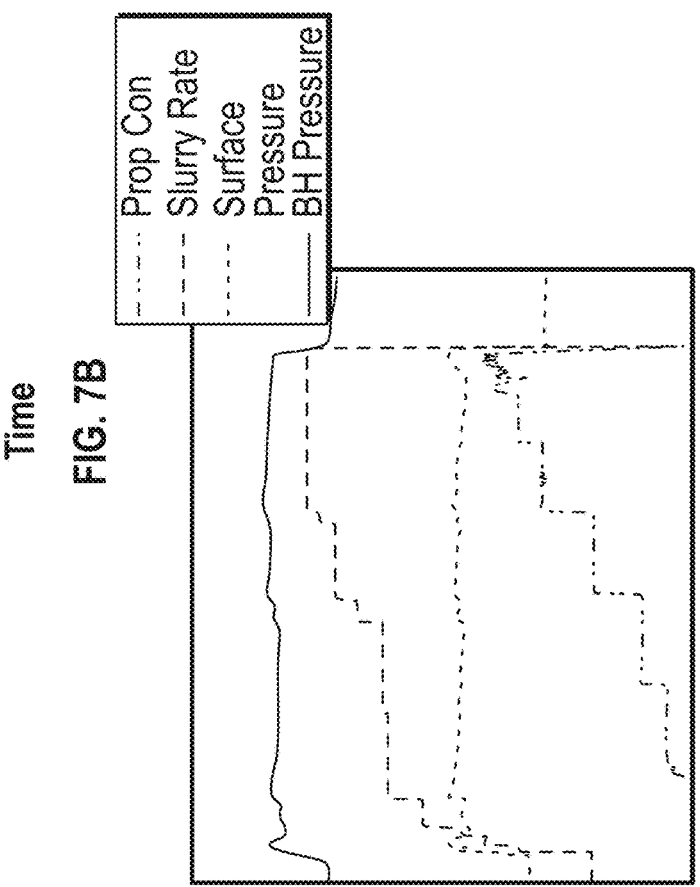

The DTS/DAS interpretation of the injected fluid distributions at the cluster level for well P3 is shown in FIG. 7A-C and FIG. 8. All clusters in each stage produced a measurable amount of acoustic energy throughout the time of pumping. This was the first qualitative indication that all clusters initiated fracturing and took a meaningful amount of fluid volume during the stimulation. FIG. 7B, in which acoustic energy is plotted against time, shows an example of the DAS data from stage 5. The red/yellow colors in the figure represents the high acoustic intensity recorded from the DAS at each of the 5 cluster locations. The acoustic energy varied somewhat with time, but was continuous throughout the pumping of the stage.

Figure 8:
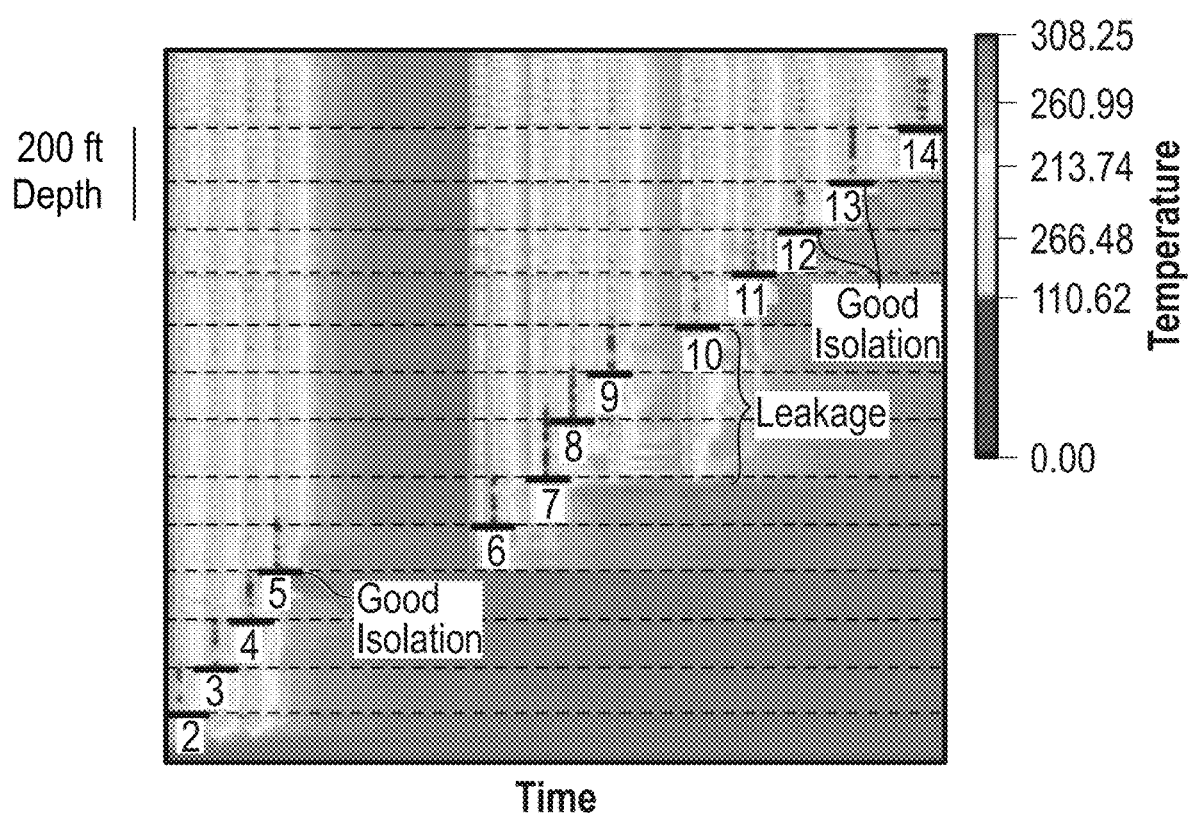
FIG. 8. DTS injection monitoring.

DTS interpretation in FIG. 8 showed cooling across all clusters, which supports the DAS conclusion that all clusters took fracture fluid. In this figure, where temperature is plotted against time, the red color indicates higher temperatures and blue lower temperatures. Each stage can be identified in depth by the horizontal dashed lines representing the plug depths. The lowest temperatures recorded were at the depths of the perforation clusters associated with the stage being pumped. In FIG. 8, multiple stages show cooling below the plug that was intended to provide hydraulic isolation from the previously pumped stage. In 10 of the 13 stages monitored, fluids were leaking below the plug and stage isolation was not complete.

Figure 7A:
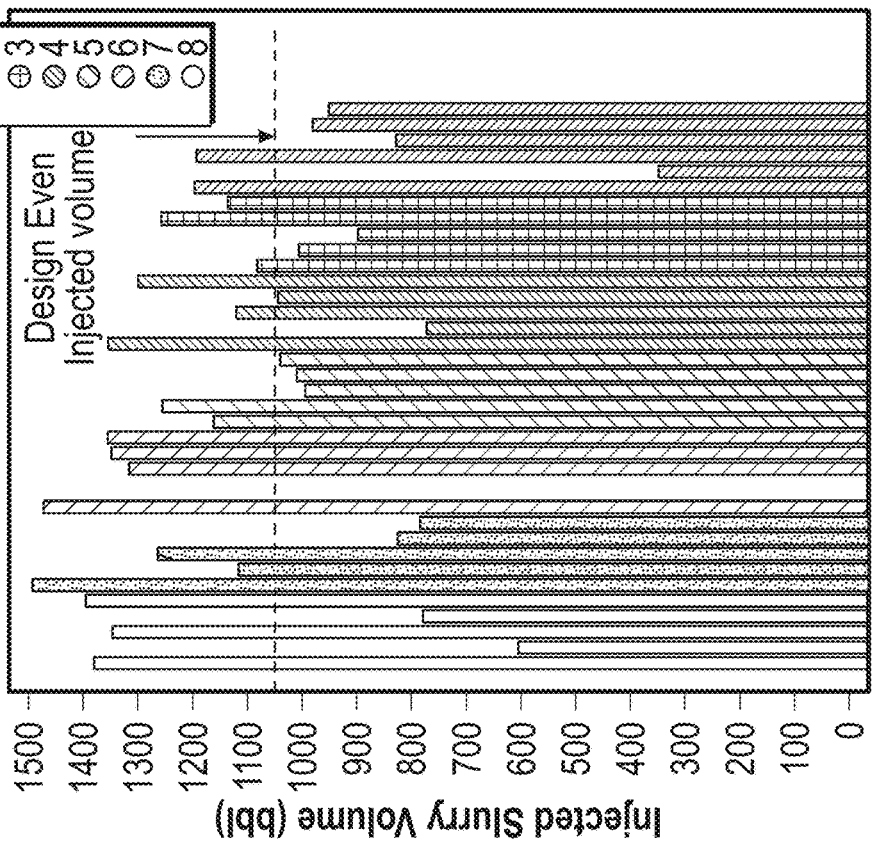

The DAS data was also used in a quantitative sense to interpret plug leakage and injected fracture fluid (slurry) volumes by cluster. In this proprietary method, it was assumed that the DAS intensity as a measure of the flow volume through each perforation. The results from stages 2-8 are shown in FIG. 7A. While it verified that all clusters took meaningful amounts of fracture fluid, the quantitative analysis showed that the distribution of slurry volume into each cluster is uneven with clusters taking from 33 to 142% of the targeted cluster volume. This analysis also indicated that, for the entire wellbore, fluid loss through the plug ranges from zero in three stages, to small in four stages, to approximately 500 bbl or 10% of the total pumped volume in six of the stages.

The disclosed data acquisition program utilized the core, image log, microseismic, DTS/DAS, and pressure data gathered from the pilot before and after the hydraulic fracturing.

Core and Image Logs

In this study, it was necessary to distinguish between hydraulic, natural and drilling induced fractures. In most cores, identification of natural and drilling induced fractures is relatively routine using fracture mineralization, surface markings, and orientation and form with respect to the core axis (Kulander et al. 1990). However, in the absence of natural fracture mineralization or a distinct difference in orientation, hydraulic and natural fractures can be hard to distinguish. To characterize the natural fracturing in this area, which was unknown, a pre-stimulation, baseline core and image log were acquired. Well S2, was drilled at the same stratigraphic depth and just 270 ft. along strike from S3, the first post-stimulation sample well.

When interpreting the hydraulic fracture pattern within the SRV, it must be noted that, except for the toe-ward end of ST03, all the wells cut the SRV above the level of the stimulated producer, and all cores were acquired above the level of the stimulated wells. Despite sampling over 7,700 continuous feet of the SRV volume, the overall geometry of the SRV remains statistically under-sampled with key areas immediately adjacent to and below the producer being completely unsampled.

The pre-stimulation S2 core was taken with a mud system that was significantly over balanced. This resulted in the formation of many drilling induced fractures in the core and borehole wall perpendicular to the wellbore. In the core, these were identified primarily by the presence of distinct surface arrest lines that initiated a few millimeters from the edge of the core and typically wrapped around the upper, but occasionally also the lower, half of the core. These drilling induced fractures were present in every foot of the S2 core. They were also abundant in the image log from the well.

The 200 ft of core from S2 contained just 4 natural fractures. The natural fractures are not mineralized and trend NE/SW with 75-80° dips to the SE. The image log from the vertical S1 well contained a single natural fracture within Shale 1 and it parallels the S2 fractures. This paucity of fracturing supported the belief that the pilot was placed in an area without faulting and with very limited natural fracturing. These natural fractures differ in orientation from the drilling induced fractures by just 10-15°. This similarity in orientation caused challenges to fracture classification from the image logs alone and was a factor in angling the later Phase 2 sidetrack wells away from the principal stress direction to create a larger angular difference between the fracture types and facilitate their identification in the image logs.

Although the 4 natural fractures from the S2 core were interpreted to be un-mineralized, a hydraulic origin could not be absolutely eliminated. Well P1, the original well on this lease, which is approximately 1,300 ft to the northeast and well within the DAS recorded envelope for cross well events, was completed a year prior to pilot operations. Therefore, the fractures could also be hydraulic in origin from well P1.

The cores from S3 and S3 (STO3) contained many hydraulic fractures and far fewer drilling induced fractures. Both wells were drilled with mud much closer to the formation pressure and no stress indicators such as breakouts or drilling-induced tensile fractures were observed. The hydraulic fractures have the following characteristics: un-mineralized; oriented NE/SW transverse to the well; steeply dipping; planar with, when present, surface markings indicative of extensional or hybrid origin; and non-uniformly spaced. The case for a hydraulic origin is deductive.

First, these fractures were not present in the baseline core just 270 ft away and in this structurally quiet area it is unlikely that hundreds of natural fractures would form along trend over such a short distance. Second, they are aligned with both present day stress and the linear event clusters seen in the microseismic; thus, they parallel the anticipated hydraulic fracture direction. Third, surface features, such as arrest lines and plumose features (having many fine filaments or branches that give a feathery appearance), indicate an extensional or hybrid (mixed-mode) origin. Finally, embedded proppant was found on the surface of two of the hydraulic fractures. Although a reactivated natural fracture origin cannot be eliminated, it is much less likely.

While the hydraulic fractures are generally planar, their surfaces may be smooth or occasionally stepped. Fracture surface roughness is affected by lithology. The fractures within the organic marl beds are generally extremely smooth whereas those in the more calcareous layers display small ridges parallel to bedding and may have arrest lines or plumose features indicative of upward and lateral fracture propagation. Surface features indicating shear are absent. The cores contain examples of the hydraulic fractures being refracted at bedding surfaces and of bent arrest lines and one hydraulic fracture has a 3-mm step where it crosses a bedding surface. Ridges and steps in the hydraulic fracture surfaces have implication for proppant transport and settling and fracture permeability preservation during pressure draw down.

Figure 9A:
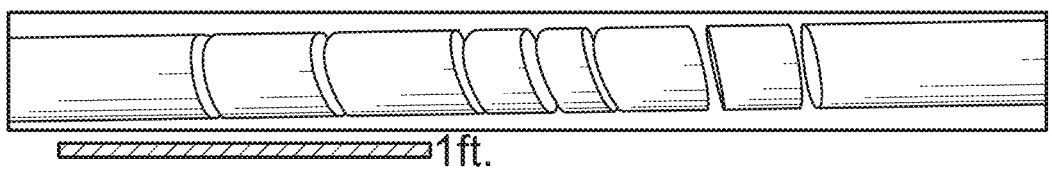
FIG. 9A-C. Hydraulic fractures in close association.
Figure 9B:
Figure 9C:
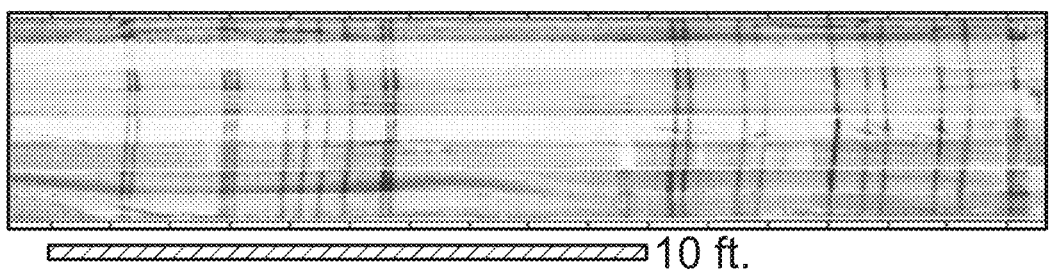
Figure 10A:
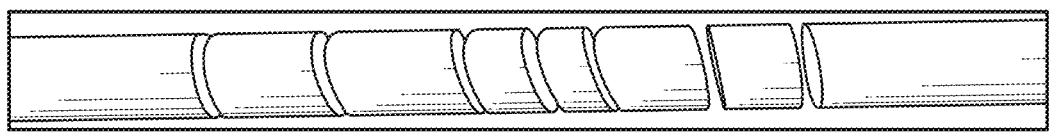
FIG. 10A-D. Hydraulic fracture swarm.
Figure 10B:
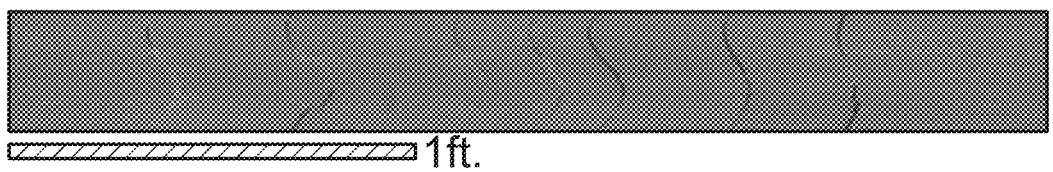
Figure 10C:
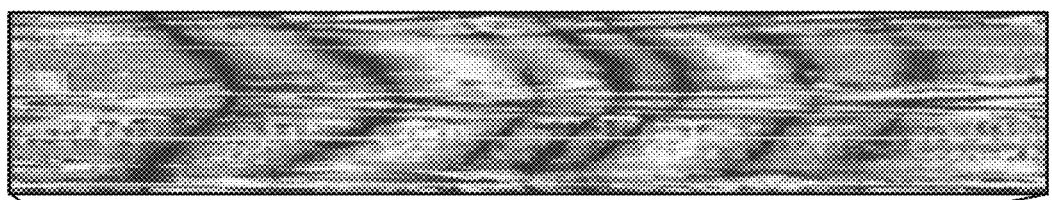
Figure 10D:
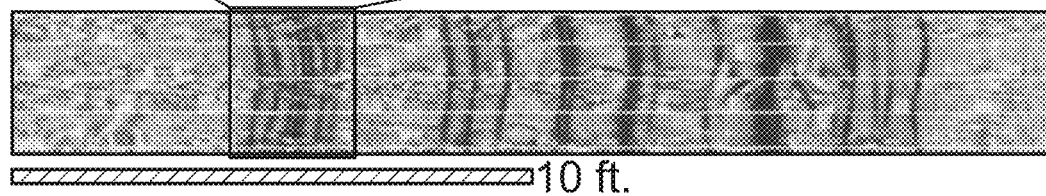

Both in core and image logs, it was observed that multiple (2-3) hydraulic fractures often develop in close association, where their orientations differ by 5-20° and they diverge with a projected line of intersection, or branch line, just outside the core or borehole wall (FIG. 9A-B). The common occurrence of these doublets and triplets along the length of the wells indicates that hydraulic fracture branching may be widespread. Branching along with the observed influence of bedding surfaces on hydraulic fracture propagation leads to the postulation that the mechanical stratigraphy resulting from interbedded organic marl and stiffer limey beds is in part responsible for much of the observed fracture complexity and the large number of fractures encountered. Other natural heterogeneities in the formation likely also impact fracture complexity.

The core adjacent to the hydraulic fractures was intact, with no visible or microscopic evidence of off-fracture damage that might enhance matrix permeability. This was supported by SEM mapping and steady state core plug permeability measurements from both the pre- and post-stimulation cores that were acquired from the same lithologic interval. In the post-stimulation case, plugs were acquired proximal and distal to hydraulic fracture faces. Regardless of origin, these samples showed no statistical difference in microscopic structure or measured permeability.

The 3 cores were also oriented using the bed orientation from the image logs, apparent bedding orientation in the core, and the borehole orientation. Core and image log fracture orientations were the same. The hydraulic fractures formed a parallel set striking N060° E and dipping 75-80° SE. The strike and dip both have a ±20° range, some of which can be ascribed to the accuracy of the core orientation method, but much of which is real and can be seen in continuous sections of core. This hydraulic fracture strike was anticipated and was consistent with the local in-situ stress field. The 75-80° dip of the fractures indicates that either these fractures are not pure opening mode but hybrid mode 1-2, or the in-situ principal stresses are rotated away from vertical/horizontal. A small sub-set of the fractures, especially in the shallower wells ST 02 and ST 03 dip to the northwest. It is unclear whether these fractures are more highly influenced by branching or splaying mechanisms, influence from local mechanical heterogeneities, or operational stress perturbations.

The distribution of hydraulic fractures along the wellbores was non-uniform. In both post stimulation cores, the hydraulic fractures form swarms (clusters), in which many fractures are spaced a few inches apart and are separated by lengths of core with several feet between fractures. The FMI-HD™ image log data, which were of good to excellent quality, were also used to analyze the spatial distribution of hydraulic fractures within the SRV. The best quality FMI-HD™ logs were taken in S3 where, over the cored section, each hydraulic fracture in the core could be correlated to a fracture in the image log. The image log, however, did not resolve closely spaced fractures and showed some stretch and compression compared to the core. Nevertheless, a high degree of confidence was established in the image log interpretation such that dipping hydraulic fractures could be distinguished from drilling induced fractures, which were perpendicular to the well trajectory. Interpretation of the image logs from the sidetracks, especially the STO3, was more challenging due to higher borehole rugosity and tortuosity that resulted in tool sticking and short sections without interpretable images.

S3 and its sidetracks were sampled adjacent to stages 1-7 in the P3 producer. Thus, they sampled the rock volume stimulated by 30 perforation clusters. The number of hydraulic fractures interpreted in the image logs is shown in Table 1 and far exceeds one per perforation cluster.

TABLE 1

Number of Hydraulic Fractures from Image Log Interpretation

| Well | Length of Image Log (ft.) | # of Hydraulic Fractures |
|---|---|---|
| S3 | 1,378 | 680 |
| S3 ST01 | 1,748 | 423 |
| S3 ST02 | 1,583 | 397 |
| S3 ST03 | 1,735 | 966 |

Hydraulic Fracture Density

Figure 11:
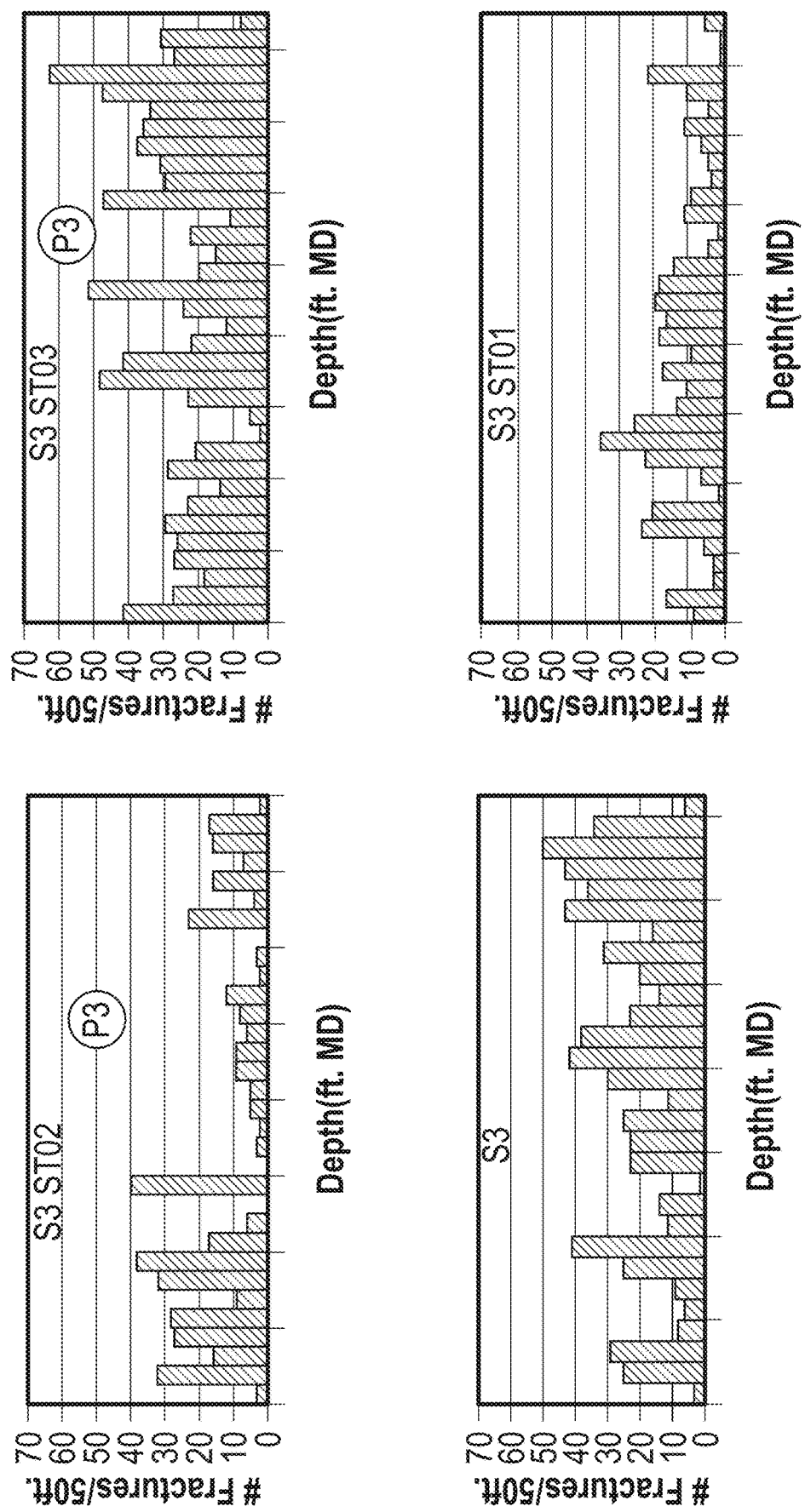
FIG. 11. Hydraulic fracture distribution where 'P3' marks the depth that the well crosses the P3 producer.

To investigate the spatial characteristics of the SRV, the hydraulic fracture density is presented in simple histograms (FIG. 11) where the fracture count in a 50 ft. window is displayed. Even at a bin size of 50 ft. the hydraulic fracture intensity is non-uniform. These plots show that overall hydraulic fracture intensities are highest in S3 and STO3 and lower in STO1 and ST02, which are drilled further out laterally and higher above the producer respectively. Fracture intensity decreases in STO1 at a measured depth of 14,750 ft., which is 40 ft above and 270 ft laterally offset from the stimulated well. While the upper few hundred feet of STO2 shows fracture densities similar to S3 and STO3, the toe-ward two-thirds of the well has much lower intensities even where the well crosses 100 ft directly above the producer, as shown in FIG. 11. Thus, while some hydraulic fractures extend well beyond the sampled area, hydraulic fracture intensities decrease more rapidly with height than with lateral distance. This implies that the SRV is considerably wider than it is tall.

Proppant

The RA tracer log from P3 indicates that proppant was well distributed amongst clusters at the source location (FIG. 2). To determine proppant distribution in the sample wells, a two-part proppant study was performed. First, cuttings were collected at a 20 ft. interval throughout the drilling and coring of the sample wells. The samples were washed, dried and sieved through a 70-mesh screen to remove fine particles and then were examined visually and the abundance of proppant grains was estimated semi-quantitatively. The samples containing proppant for all 4 post-stimulation wells are tabulated in Table 2. The shallowest proppant grain was encountered in S3_STO2 approximately 120 ft. TVD above the producer. Proppant was much more abundant in S3, which is the lateral that is consistently closest to the producer, where proppant was detected in 76% of the cuttings samples. Conversely, just 5% of the cuttings samples in STO1, which is the shallowest well at 100 ft. above the producer, contained proppant.

TABLE 2

Proppant Grain Distribution in Cuttings Samples

| Well | # Samples | % Containing > 1 Proppant Grain |
|---|---|---|
| S3 | 89 | 76% |
| S3 ST01 | 143 | 21% |
| S3 ST02 | 146 | 5% |
| S3 ST03 | 103 | 15% |

The second part of the proppant work involved visual inspection of the surface of each cored fracture for sand gains and proppant indentations. All mud and debris from the fracture surfaces were collected for laboratory analysis. Small numbers of proppant grains were found on many hydraulic fracture surfaces. In S3, at least one grain of proppant was recovered from 25% of the fracture surfaces, whereas in the STO3 core just 3 fractures contained proppant (5%). It is unknown whether these sand grains were in-situ or had been washed into the hydraulic fractures along with drilling mud.

Only two cored hydraulic fractures had sand grains embedded on their surfaces, one was in S3 and the other in STO3. Embedment pits in the surfaces of these two fractures, along with the presence of many sand grains, indicated that the proppant was in-situ and had not been washed in with the mud system. An estimate of the thickness of the proppant pack was not possible given the mud invasion. The presence of proppant in the cuttings and core confirms that the wells sampled some portion of the propped SRV and the proppant is more abundant at the S3 location than in wells drilled further from the producer.

Fracture Characteristics

The observations from this pilot lead to a new and different understanding of the SRV. It was concluded that reservoir permeability enhancement in the SRV results principally from hydraulic fractures and that matrix damage is extremely limited or absent. Hydraulic fractures were numerous, widespread, closely spaced, steeply dipping, and branch. Most form a near parallel set. Hydraulic fracture surfaces were rough and may step where they cross bedding planes. Proppant emplacement, at the sampled locations, was sparse. Some hydraulic fractures are very long and extend well beyond the sampled area. The limited spatial data indicates that hydraulic fracture intensity decreases more rapidly with height than with lateral distance and that the SRV volume in this area could be on the order of two to three times as broad, laterally, as it is tall. This shape was generally consistent with the shape of the microseismic event cloud.

The broadly parallel nature of hydraulic fractures and their large number indicated that SRV permeability is likely to be highly anisotropic on a reservoir scale. The rugosity of the hydraulic fracture surfaces will influence both proppant transport and settling. The sparsity of proppant, especially at more distant locations in the SRV, indicated that fracture permeability and its preservation during pressure draw down may be spatially heterogeneous.

These findings are very different from the simple view of the SRV that are commonly modeled or predicted with current fracture models. The absence of proppant on most of the hydraulic fractures indicates that proppant emplacement is quite different from idealized transport model predictions. The apparent side-by-side propagation of closely spaced, near parallel hydraulic fractures also differs from the output of currently accepted fracture models and may call into question the role of stress shadowing in hydraulic fracture propagation. Stress shadowing may have contributed to non-uniformity, but did not cause fractures to turn severely or fully inhibit the propagation of closely spaced fractures.

Correlations

Figure 12:
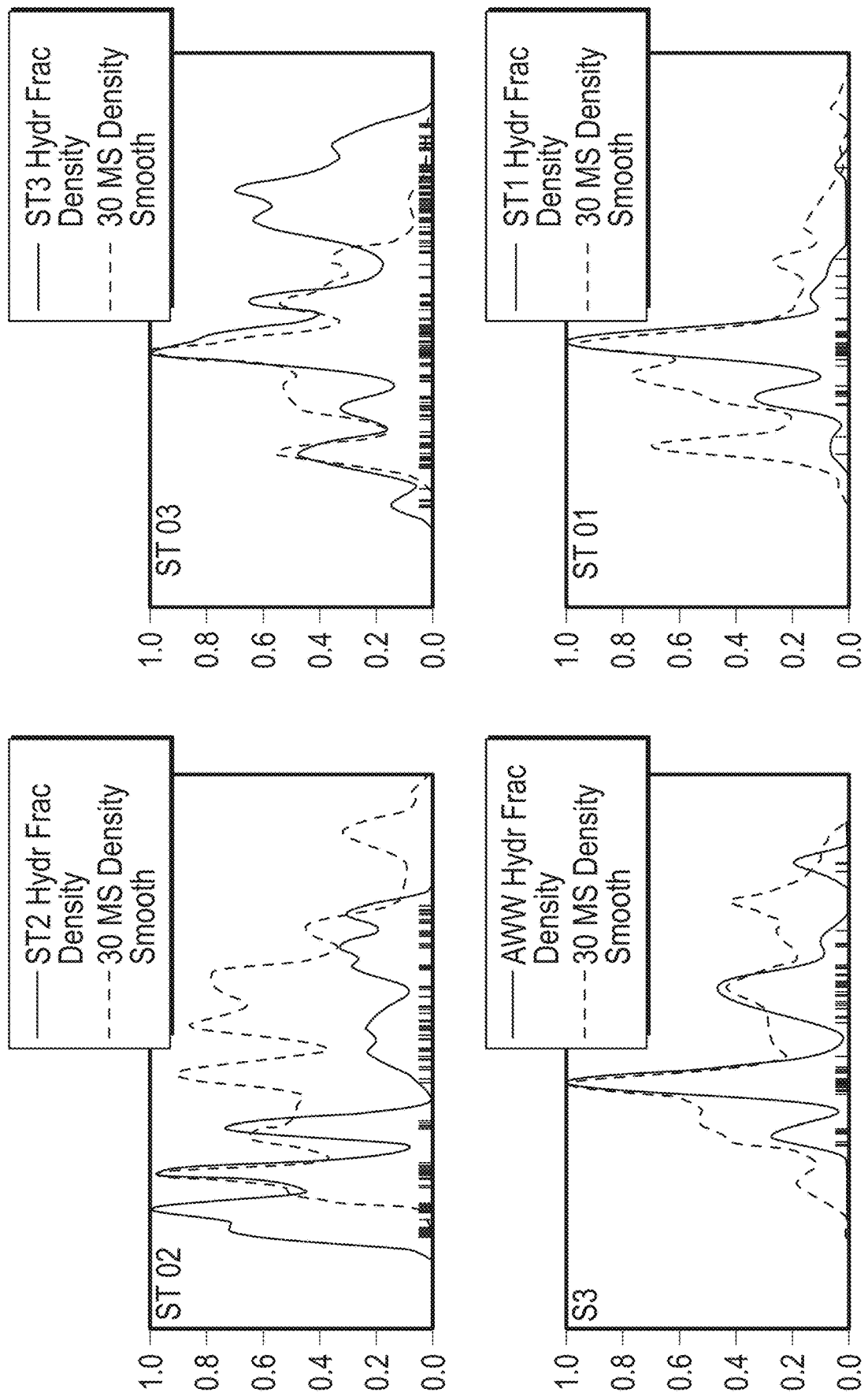
FIG. 12. Fracture distribution along the well paths. Green curve is Gaussian Kernel of microseimic density. Blue curve is Gaussian Kernal of hydraulic fracture density and actual fracture location along each wellbore is shown by blue vertical lines at the base of each plot.

The relationship between fracture density and cluster spacing was investigated by calculating a Gaussian Kernel Function, with a bandwidth of 6 feet, from the S3 well and is shown in FIG. 12. Fourier spectral analysis was applied to determine the periodicity of densely spaced fractures or swarms. Data adjacent to stages 1 through 7 of well P3 were analyzed. Stages 3, 4, and 5 exhibit a signal with a swarm spacing of 45 feet. The average cluster spacing was 47 feet. Stage 1 was not expected to show a strong dependence because this stage was not completed. Hence, 3 of 6 completed stages reflect a positive correlation of swarm occurrence with treated cluster spacing projected from the adjacent stimulated well, whereas 3 do not.

Understanding the relationship between the observed hydraulic fractures and microseismic events was complicated by the different scale at which the two measurements are recorded and the discrete nature of both events. A probability density function of the discrete location of both was calculated using the approach of Silverman (1986), which results in a smooth distribution using a Gaussian Kernel. To determine the bandwidth for construction of the density estimates, the method of Sheather and Jones (1991) was adopted. The relationship between the two measurements was determined by cross plotting and computation of a Pearson correlation.

The correlation of microseismic events to sampled hydraulic fracture density are summarized in Table 3 and FIG. 12. Although multiple combinations of microseismic attributes and fracture characteristics were examined, only a few showed any degree of correlation. The total hydraulic fracture population associated with wellbores S3, S3_STO1 and S3_STO3 showed none to moderate positive correlation to microseismic event density; notably, these correlations improved when the hydraulic fracture population was restricted to include only shallowly dipping fractures (<70°). However, similar dependencies were not exhibited in sidetrack S3_STO2.

Given that over 75% of the total hydraulic fracture population lacks a strong positive correlation to microseismic event density, it is difficult to conclude that event maps can be used as a proxy for fracture density or for that matter, effective permeability. In some cases, assuming such a relationship could be misleading. For example, hundreds of fractures were sampled in the toe region of the P3 well and yet microseismic events at this location are quite scarce (FIG. 3). This observation is not meant to imply that microseismic data is not useful in delineating the character and morphology of fracturing; it is simply insufficient to explicitly define the outcome in a quantitatively reliable manner.

TABLE 3

Correlation Between Gaussian Kernel Density of Hydraulic Fractures and Microseismic

| Maximum Dip | S3 Correlation | S3 ST01 Correlation | S3 ST02 Correlation | S3 ST03 Correlation | S3 # Fractures | S3 ST 01 # Fractures | S3 ST 02 # Fractures | S3 ST03 # Fractures |
|---|---|---|---|---|---|---|---|---|
| 90 | −0.07 | 0.58 | −0.10 | 0.11 | 680 | 423 | 397 | 966 |
| 85 | −0.11 | 0.52 | −0.12 | 0.15 | 592 | 351 | 382 | 821 |
| 80 | 0.06 | 0.54 | −0.12 | 0.21 | 414 | 230 | 342 | 578 |
| 75 | 0.64 | 0.69 | −0.14 | 0.35 | 163 | 103 | 287 | 347 |
| 70 | 0.78 | 0.75 | −0.15 | 0.56 | 70 | 47 | 238 | 195 |
| 65 | 0.8 | 0.79 | −0.23 | 0.58 | 41 | 28 | 282 | 111 |
| 60 | 0.79 | 0.73 | −0.34 | 0.73 | 29 | 15 | 121 | 53 |
| 55 | 0.71 | 0.78 | −0.44 | 0.76 | 11 | 10 | 79 | 29 |

A similar correlation technique was employed to determine the relationship between fracture density and total fluid injected at the cluster level as calculated from DAS data. A Pearson Correlation Coefficient of 0.13 was obtained, indicating essentially no correlation between the two data sets.

Model Results

Figure 13:
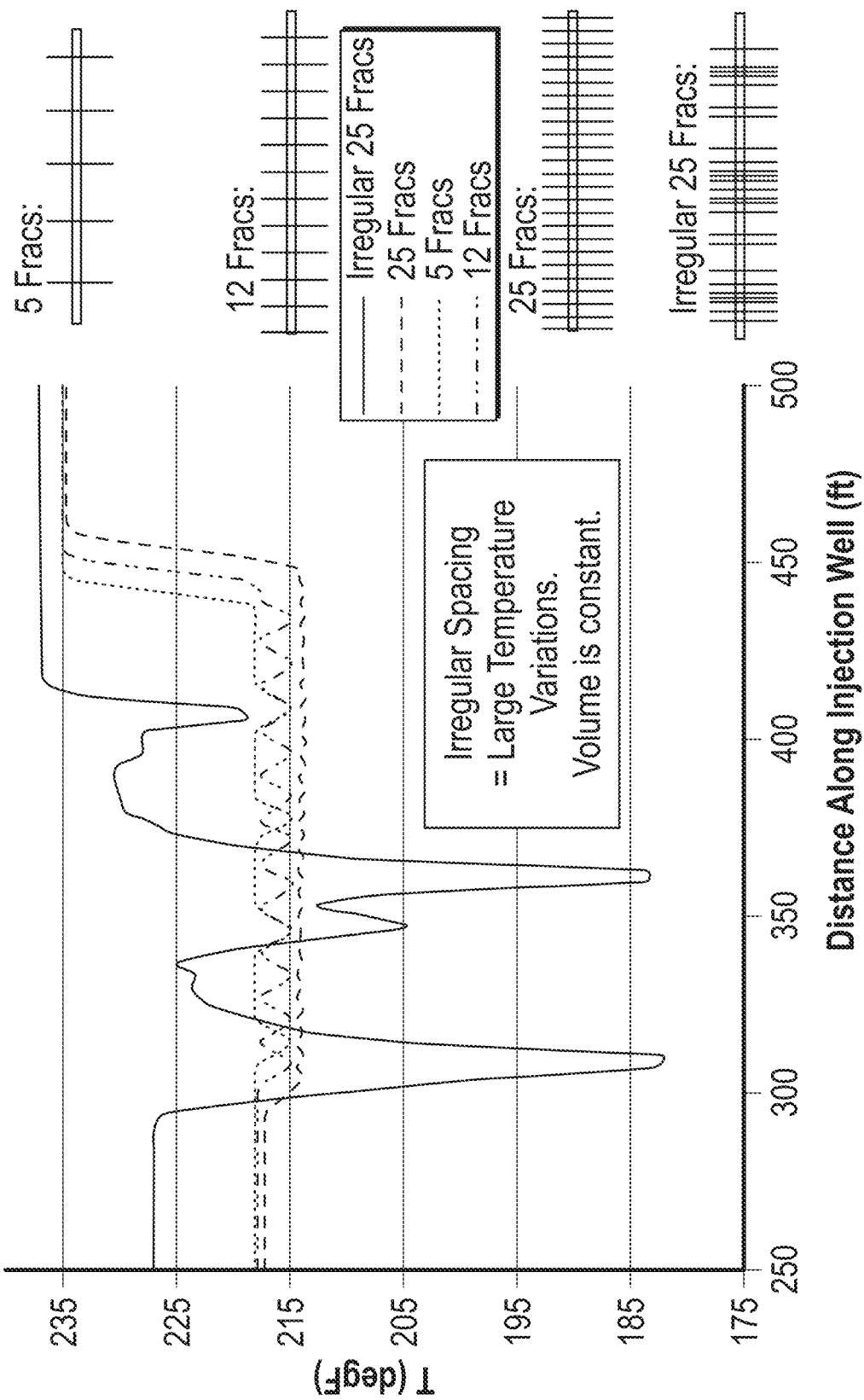
FIG. 13. Modeling warmback at an injection well. 5 fractures (green), 12 fractures (purple), 25 fractures (red) and 25 irregular fractures (blue) were modeled for 3 day warmback in an injection well.
Figure 14:
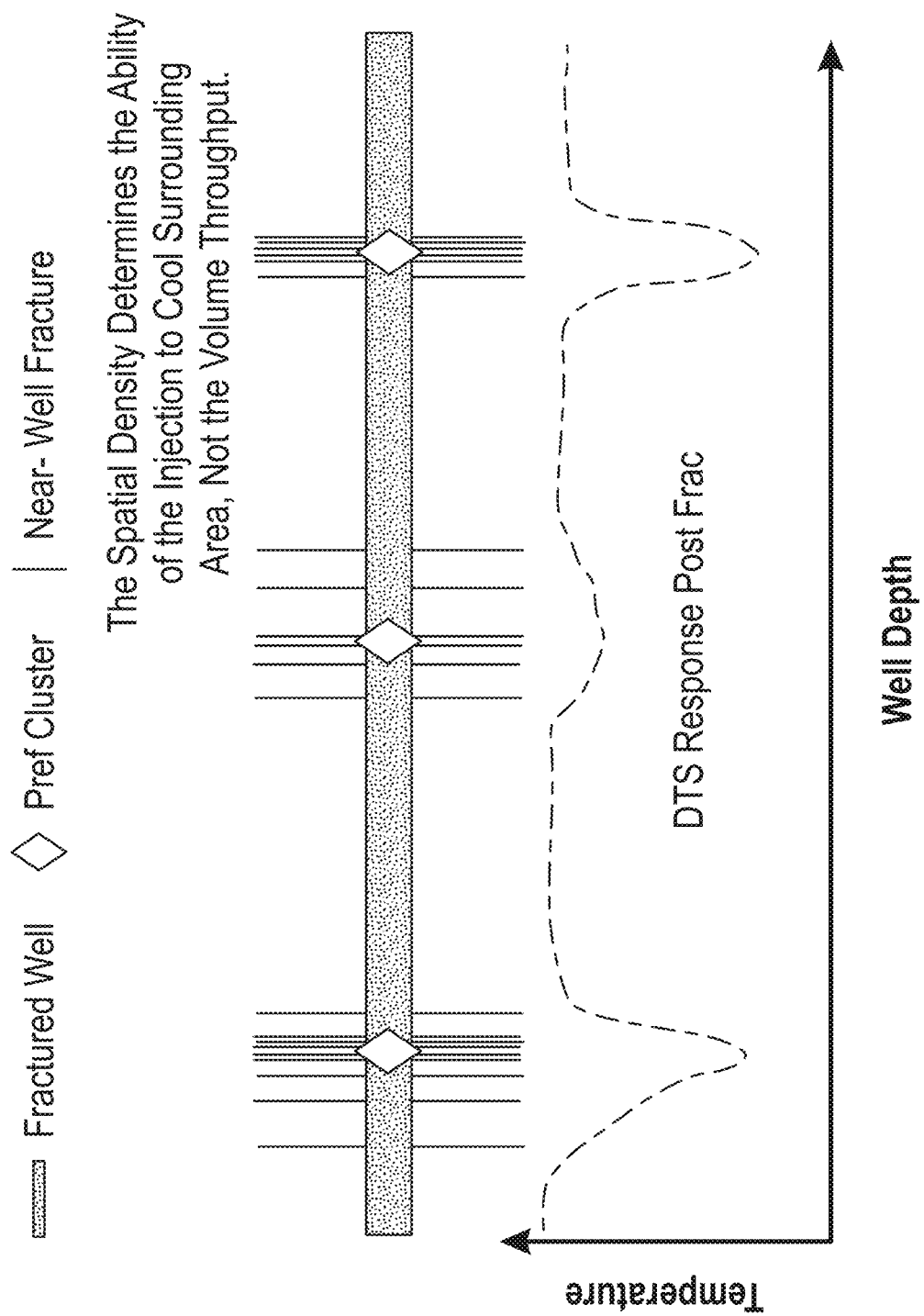
FIG. 14. Distribution (Volume)≠Frac Spatial Density
Figure 15:
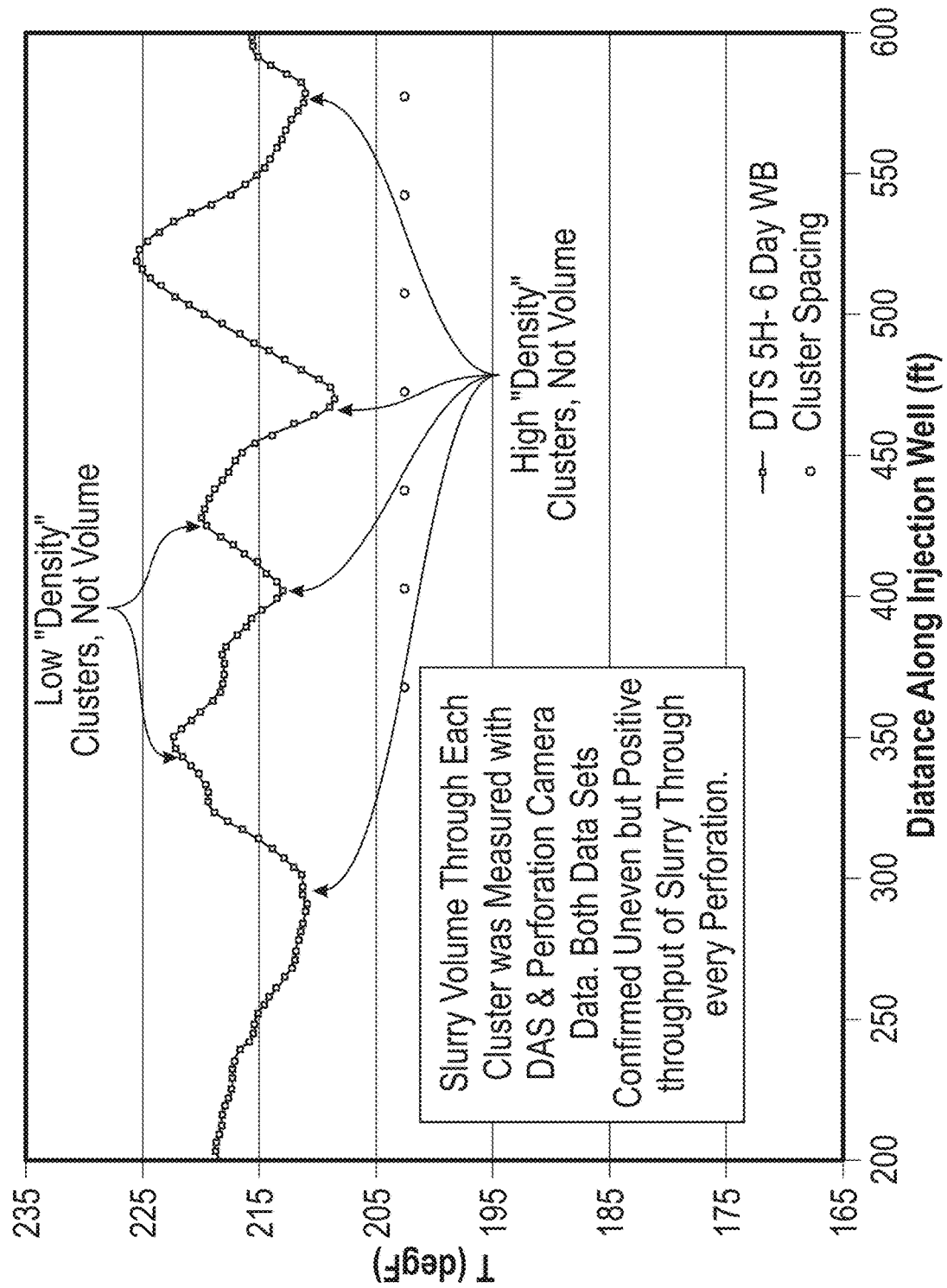
FIG. 15. Real DTS data

FIG. 13 shows a fracturing model for warmback at an injection well. Slurry volume through each cluster was measured with DAS & perforation camera data as shown in FIG. 14. Both data sets confirmed uneven but positive throughput of slurry through every perforation. In FIG. 15, slurry volume through each cluster was measured with DAS & perforation camera data. Both data sets confirmed uneven but positive throughput of slurry through every perforation.

Figure 16:
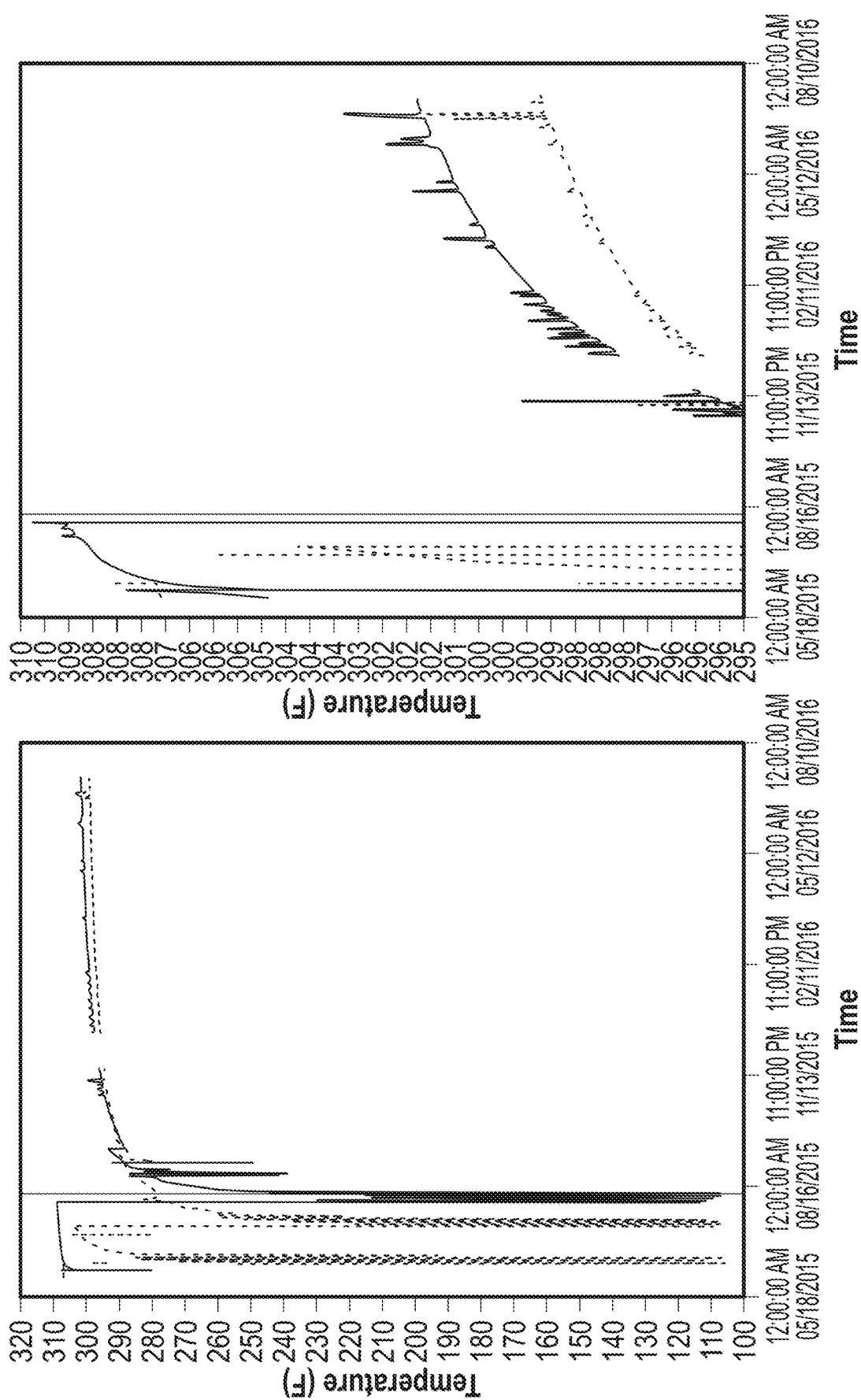
FIG. 16. Residual frac cooling effect is long lasting
Figure 17:
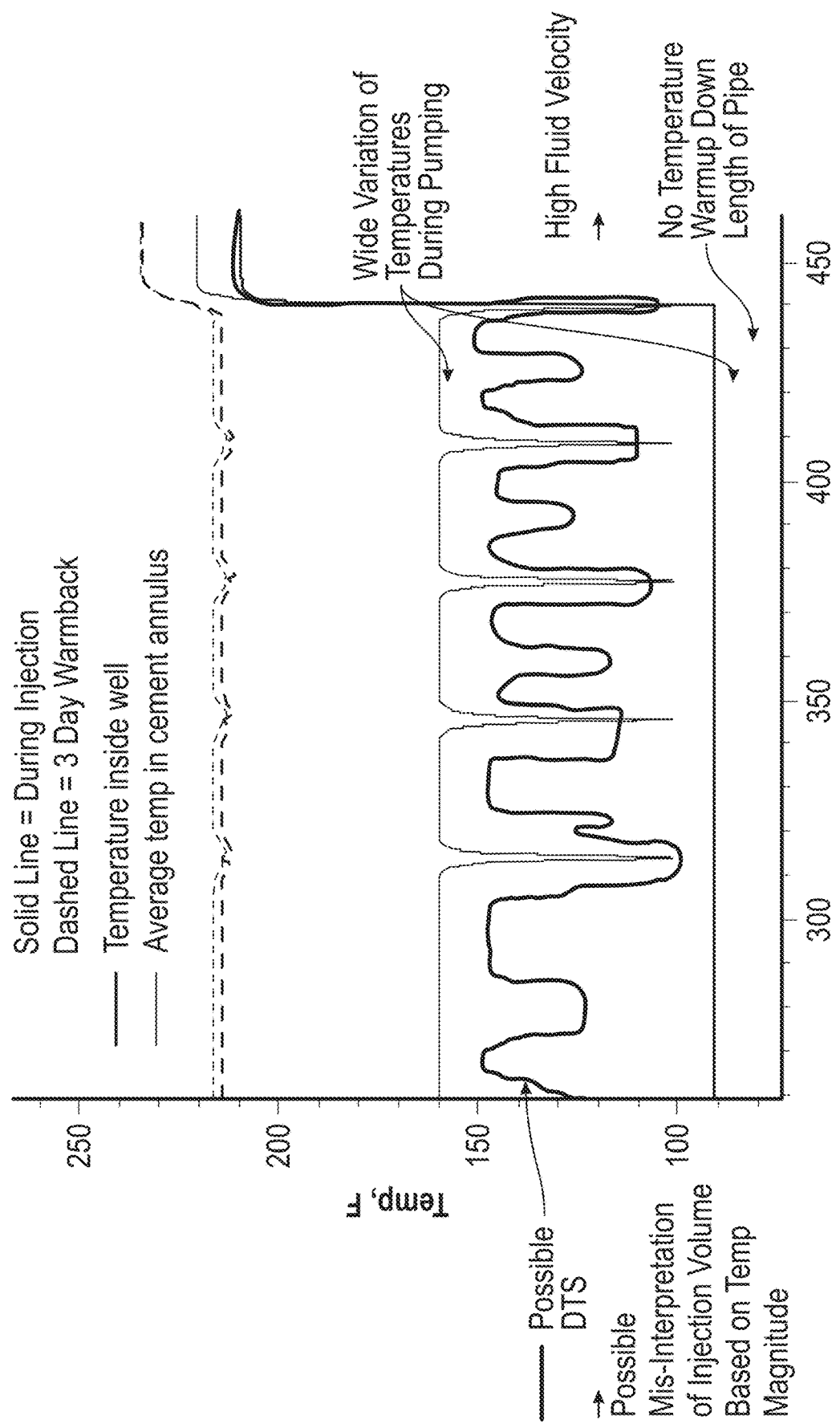
FIG. 17. Thermal Radius of Investigation.
Figure 18:
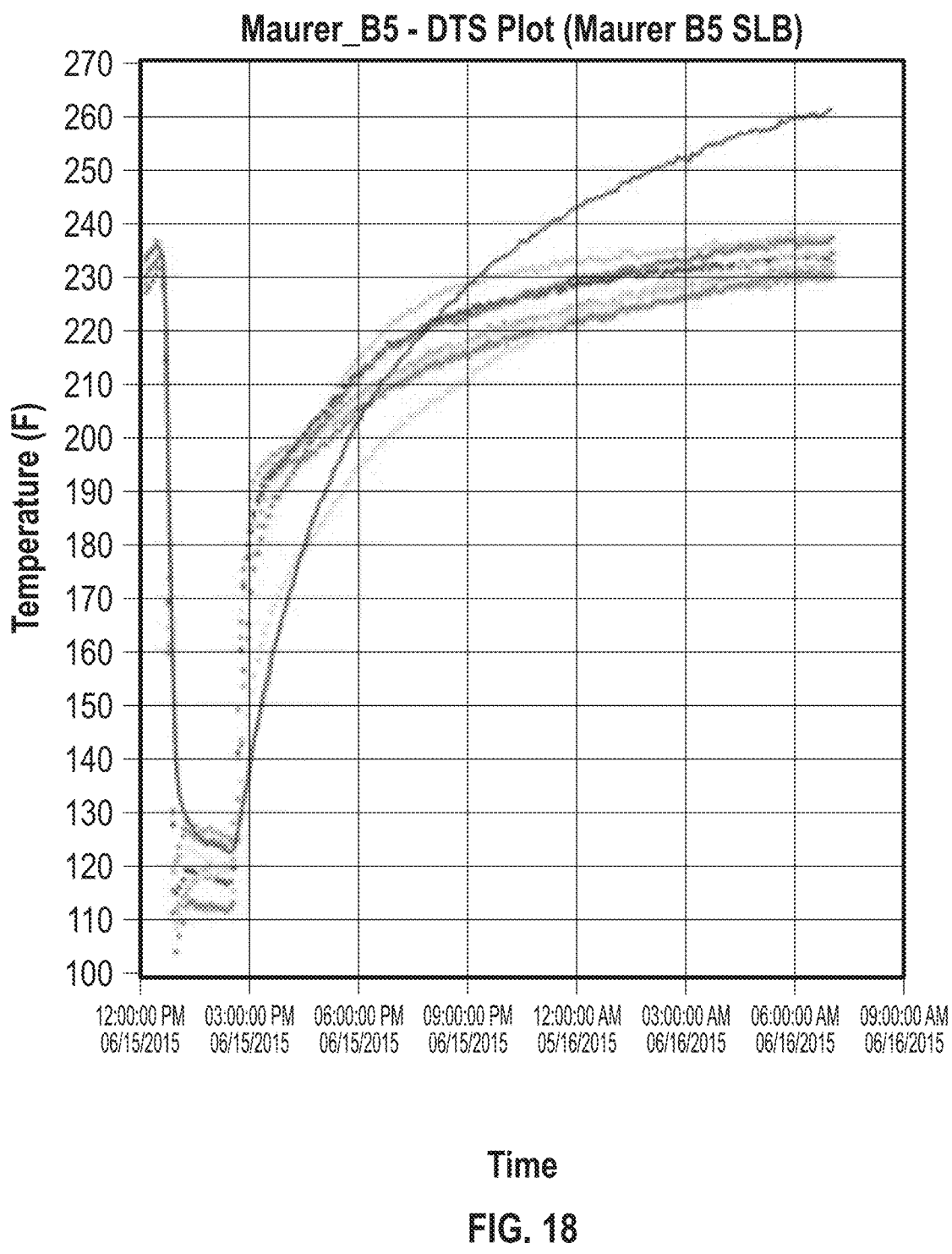
FIG. 18. Cross-flow

Residual frac cooling effect is long lasting as shown in FIG. 16. Real data supports residual frac cooling. Production does not overcome the impact of fracture cooling. The thermal radius of investigation, as shown in FIG. 17, indicates a wide variation of temperatures during pumping and no temperature warmup down the length of the pipe. Temperature changes in magnitude may be misinterpreted if based solely on possible DTS temperature changes. Thus, early time warmback (hours) data should not be used in analysis. As shown in FIG. 18, cross flow can be observed through rapid thermal increases which are indicative of greater conduction. Thus in order to get past low radius of investigation and crossflow effects, later time warmback after multiple days should be used for analysis.

In conclusion, temperature warmback data in an unconventional well is a measure of the frac spatial density near-well, a concept which becomes apparent when sampling the SRV. DTS warmback data is a measure of spatial efficiency and DAS during fracturing is a measure of volume distribution efficiency, which are not the same thing.

For intervention data acquisitions: Leverage the concept of residual frac cooling to get completion diagnostics without monitoring during actual frac. More appropriate for completions test which alter frac geometry and not fluid distribution. Combine with production logging methods if possible.

For permanent data acquisitions: Measure injection volume distributions with DAS, not DTS. Temperature data viewed as the geometric/spatial tool to complement the DAS volumetric tool, not in competition with each other.

CONCLUSIONS

The operational success of the Shale 1 pilot has demonstrated that the SRV in a shale can be drilled and sampled and that useful information can be gathered using the disclosed acquisition program. The main outcome of the disclosed acquisition program is an improved understanding of the complex characteristics of the SRV. A compendium of significant observations and conclusions include:

Permeability enhancement was realized through discrete fractures rather than distributed matrix damage. The effective reservoir permeability was presumed to be anisotropic. The fractures were not evenly distributed spatially; thus, reservoir drainage may be non-uniform.

The hydraulic fractures were numerous and broadly parallel. There are many more fractures than perforation clusters. Pre-existing natural fractures do not appear necessary to achieve a complex, distributed fracture system.

Hydraulic fractures form swarms that, in some, but not all stages, show a relationship to cluster spacing.

The hydraulic fracture trend was perpendicular to the minimum horizontal in-situ stress. The fractures were steeply dipping rather than vertical.

Fracture deflection, offset and branching at bedding surfaces and other naturally occurring heterogeneities appeared to significantly influence fracture complexity.

In the pilot area, the hydraulic fracture density decreased above and laterally away from the producer. This indicates that the hydraulically fractured volume could be on the order of two to three times as broad, laterally, as it was tall. This shape was generally consistent with the shape of the microseismic event cloud.

The SRV was still grossly under sampled by the 7,700 ft. of well-paths that cut through it in this project. This makes the three-dimensional characteristics of the SRV difficult to describe accurately.

Although the stimulation very efficiently fractured the formation, proppant emplacement appeared to have been less successful. While proppant was recovered in the cuttings, only two cored hydraulic fractures contained in-situ evidence of proppant. This left the location of most of the proppant location undetermined. Sampling closer to the stimulated well and below it may lead to better understanding of proppant distribution.

The recorded pressure response at S1 and the coincident inter-well DAS response qualified DAS as a fracture detection tool. DAS indicates that some of the fractures propagate at least 1,500 ft, which as supported by the extent of the microseismic event cloud. DAS indicated fracture height growth extends from the Buda to the Austin Chalk.

There was no direct statistical relationship between sampled hydraulic fracture density and microseismic event density. There is moderate correlation of microseismic events to fractures dipping at greater than 70 degrees.

The stimulation monitoring by DTS/DAS showed that all perforation clusters took fluid; however, the volume was not equally distributed amongst clusters within a stage as planned. In many stages, the plugs isolating the previous stage leaked leading to over-flushing of some stages and possibly a less efficient stimulation.

These observations affected Applicant's approach to completion design, well design and well spacing and stacking for the reservoir. The observed hydraulic fracture complexity and heterogeneity have caused a re-examination of design standards and expectations regarding cluster spacing, effective proppant distribution, proppant propagation and the spatial extent of effective reservoir drainage. Furthermore, it has emphasized significant challenges to forward modeling fracture propagation, the spatial distribution of production performance and long term multi-well interactions.

Though not used in the pilot study, the collected data can be combined with other techniques to accurately monitor and conduct well stimulation as well as modify the stimulation program as it proceeds.

The following references are incorporated by reference in their entirety for all purposes.
1. US-2014-0358444, "Method of Hydraulic Fracture Identification Using Temperature" (2013-05-31)
2. US-2018-0016890, "Hydraulic Fracture Analysis" (2013-05-31)
3. US-2017-0260839, "DAS for Well Ranging" (2016-03-09)
4. US-2017-0260842, "Low Frequency Distributed Acoustic Sensing" (2016-03-09)
5. US-2017-0260846, "Measuring Downhole Temperature by Combining DAS/DTS Data" (2016-03-09)
6. US-2017-0260849, "DAS Method of Estimating Fluid Distribution" (2016-03-09)
7. US-2017-0260854, "Hydraulic fracture monitoring by low-frequency DAS" (2016-03-09)
8. US-2017-0342814, "Low-Frequency DAS SNR Improvement" (2016-03-09)
9. US-2018-0045040, "Production Logs from distributed acoustic sensors," (2016-03-09)
10. Silverman, B. W. 1986 Density Estimation for Statistics and Data Analysis. London: Chapman and Hall.
11. Kulander, B. R., Dean, S. L., and Ward B. J. 1990. *"Fractured Core Analysis: Interpretation, Logging, and Use of Natural and Induced Fractures in Core,"* AAPG Methods in Exploration Series, No 8. Tulsa, 1990

12. Sheather, S J, Jones M C 1991 *A reliable data-based bandwidth selection method for kernel density*. Journal of the Royal Statistical Society. Series B (Methodological), pp 683-690
13. Kevin T. Raterman, et al. *"Sampling a Stimulated Rock Volume: An Eagle Ford Example,"* Unconventional Resources Technology Conference (URTeC), 2017, URTeC: 2670034.
14. Ge Jin & Baishali Roy "Hydraulic Fracture Geometry Characterization Using Low-Frequency DAS Signal," The Leading Edge 36(12):975-980—December 2017
15. Kevin T. Raterman, et al., "Sampling a Stimulated Rock Volume: An Eagle Ford Example," SPE/AAPG/SEG Unconventional Resources Technology Conference (URTeC), 24-26 July, Austin, Tex., USA 2670034. doi.org/10.15530/URTEC-2017-2670034

The invention claimed is:

1. A method of optimizing the production scheme of a hydrocarbon-containing reservoir comprising:
  a) collecting image log, microseismic, Distributed Temperature Sensing (DTS), Distributed Acoustic Sensing (DAS), and pressure data from at least one observation well in a hydrocarbon-containing reservoir to form a pre-stimulation data set;
  b) while fracturing at least one well in a first fracture stimulation stage according to pre-determined fracturing parameters to form a set of fractures;
  c) collecting image log, microseismic, Distributed Temperature Sensing (DTS), Distributed Acoustic Sensing (DAS), and pressure data from at least said observation well in the hydrocarbon-containing reservoir to form a strain response data set;
  d) identifying said set of fractures formed in step b) from said strain response data set wherein said formation deformation is mechanically coupled with the strain rate during hydraulic fracturing and formation compression through stress shadowing;
  e) characterizing the complexity of said set of fractures;
  f) updating said pre-determined fracturing parameters based on said characterizing step; and,
  g) performing a second fracturing stimulation stage using said updated fracturing parameters in step f).

2. The method of claim 1, wherein said image log and/or microseismic data samples a stimulated reservoir volume (SRV).

3. The method of claim 1, wherein said observation well is one or more adjacent producer wells.

4. The method of claim 1, wherein said observation well collects data from one or more adjacent producer wells.

5. The method of claim 1, wherein said characterizing step further includes modeling the stimulated reservoir volume (SRV) of said reservoir.

6. The method of claim 5, further comprising repeating steps a) to f) of the method and updating the model of said SRV iteratively.

7. The method of claim 1, wherein a relative extent of stimulated reservoir volume (SRV) is estimated from microseismic and cross well DAS fracture density spatially assigned through a statistical analysis of drill through data.

8. A non-transitory computer readable storage medium storing a computer program product for characterizing a hydraulic fracturing stimulation, said computer program product comprising:
  a) integrated core data, image log data, microseismic data, Distributed Temperature Sensing (DTS) data, Distributed Acoustic Sensing (DAS) DATA, and pressure data from at least one observation well in a hydrocarbon-containing reservoir,
  b) integrated core data, image log data, microseismic data, Distributed Temperature Sensing (DTS) data, Distributed Acoustic Sensing (DAS) DATA, and pressure data during fracturing of a reservoir to form a strain response data set,
  c) computer code for estimating a stimulated reservoir volume (SRV) that is being fractured from the data in a) and b) wherein said computer code identifies said set of fractures formed in step b) from said strain response data set wherein formation deformation is mechanically coupled with a strain rate during hydraulic fracturing and formation compression through stress shadowing,
  d) computer code for characterizing the complexity of said set of fractures;
  e) computer code for modifying fracturing parameters from step a) based on said characterizing step; and,
  f) computer code for performing a second fracturing stimulation using said modified fracturing parameters in step e).

9. The non-transitory computer readable storage medium storing a computer program product of claim 8, wherein modifying said fracturing parameters improves hydrocarbon production.

10. The non-transitory computer readable storage medium storing a computer program product of claim 8, wherein said image log or microseismic data samples a stimulated reservoir volume (SRV).

11. The non-transitory computer readable storage medium storing a computer program product of claim 8, wherein said observation well is one or more adjacent producer wells.

12. The non-transitory computer readable storage medium storing a computer program product of claim 8, wherein said Distributed Temperature Sensing (DTS) data, Distributed Acoustic Sensing (DAS) DATA, and pressure data are collected from one or more adjacent producer wells.

13. The non-transitory computer readable storage medium storing a computer program product of claim 8, wherein said characterizing step further includes modeling the stimulated reservoir volume (SRV) of said reservoir.

14. The non-transitory computer readable storage medium storing a computer program product of claim 13, further comprising repeating steps c) to e) and modifying the model of said SRV iteratively.

15. The non-transitory computer readable storage medium storing a computer program product of claim 8, wherein a relative extent of stimulated reservoir volume (SRV) is estimated from microseismic and cross well DAS fracture density spatially assigned through a statistical analysis of drill through data.

* * * * *